United States Patent [19]

Sasaki et al.

[11] Patent Number: 5,825,947
[45] Date of Patent: Oct. 20, 1998

[54] OPTICAL REPRODUCING SYSTEM FOR MULTIMEDIA INFORMATION RECORDED WITH CODE DATA HAVING FUNCTION FOR CORRECTING IMAGE READING DISTORTION

[75] Inventors: Hiroshi Sasaki, Hachioji; Takao Tsuruoka, Machida, both of Japan

[73] Assignee: Olympus Optical Co., Ltd., Tokyo, Japan

[21] Appl. No.: 679,227

[22] Filed: Jul. 12, 1996

[30] Foreign Application Priority Data

Sep. 1, 1995 [JP] Japan ................................. 7-225272

[51] Int. Cl.$^6$ ............................. G06K 9/20; G06K 9/46
[52] U.S. Cl. ......................... 382/321; 382/287; 382/288; 382/309; 235/456; 235/494
[58] Field of Search ................... 235/469, 456, 235/454, 494; 382/254, 306, 321, 275, 274, 291, 287, 288, 309

[56] References Cited

U.S. PATENT DOCUMENTS

| | | | |
|---|---|---|---|
| 5,153,928 | 10/1992 | Iizuka | 382/321 |
| 5,327,510 | 7/1994 | Morikawa et al. | 235/494 |
| 5,343,031 | 8/1994 | Yoshida | 235/456 |
| 5,408,543 | 4/1995 | Yoshida | 235/494 |
| 5,410,620 | 4/1995 | Yoshida | 235/494 |
| 5,454,054 | 9/1995 | Iizuka | 382/321 |
| 5,479,004 | 12/1995 | Priddy et al. | 235/494 |
| 5,504,322 | 4/1996 | Pavhidis et al. | 235/494 |
| 5,541,396 | 7/1996 | Rentsch | 235/454 |
| 5,616,905 | 4/1997 | Sugiyama | 235/456 |
| 5,664,030 | 9/1997 | Iizuka | 382/321 |

FOREIGN PATENT DOCUMENTS

067055A1  9/1995  European Pat. Off. .........  G06K 1/12

*Primary Examiner*—Jon Chang
*Attorney, Agent, or Firm*—Frishauf, Holtz, Goodman, Langer & Chick

[57] ABSTRACT

An image pickup unit optically reads, from an information recording medium having a portion that records multimedia information including at least one of audio information, video information, and digital code data in the form of an optically readable code pattern, the code pattern. A conversion unit converts the code pattern read by the image pickup unit into code data as an image. A block extraction unit extracts a block as a predetermined data unit from the code data by processing the code data converted by the conversion unit. A reference coordinate calculation unit calculates a reference coordinate position for determining the data reading coordinate position in the block by approximation using an Nth-degree curve passing the centers of a plurality of dots arranged at predetermined relative positions on the image upon extraction of the block as the predetermined unit of data from the code data by the block extraction unit.

5 Claims, 14 Drawing Sheets

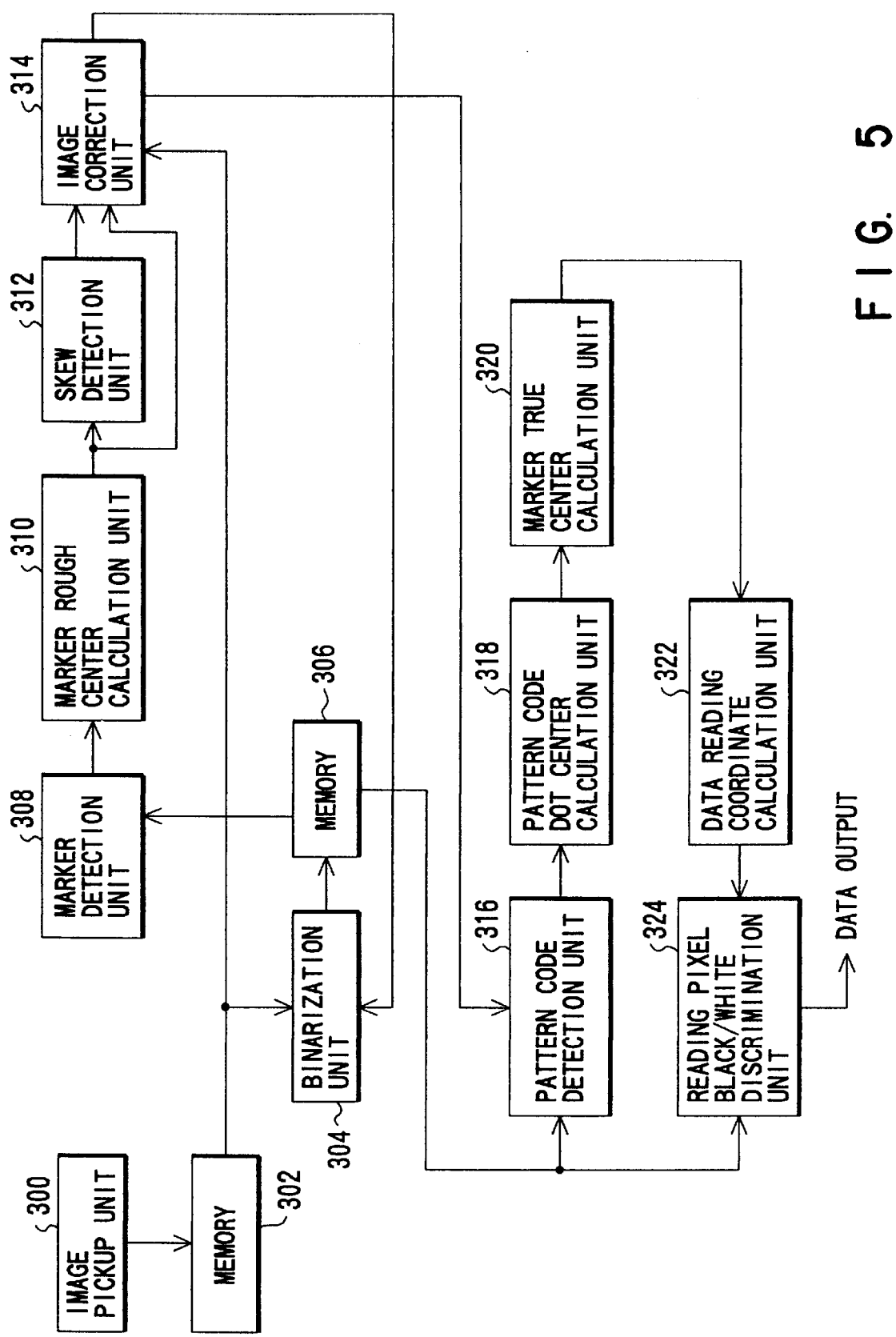
F I G. 5

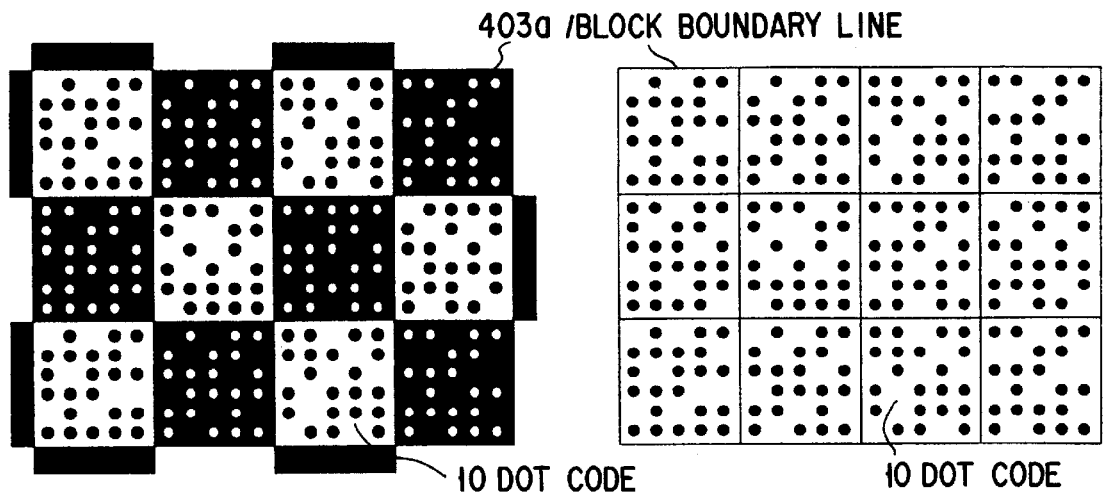
FIG. 9A
FIG. 9B
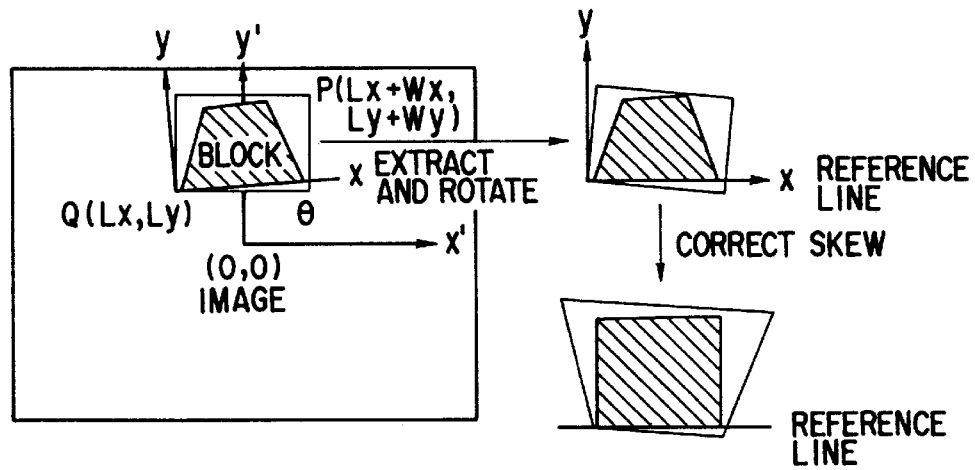
FIG. 9C
FIG. 9D
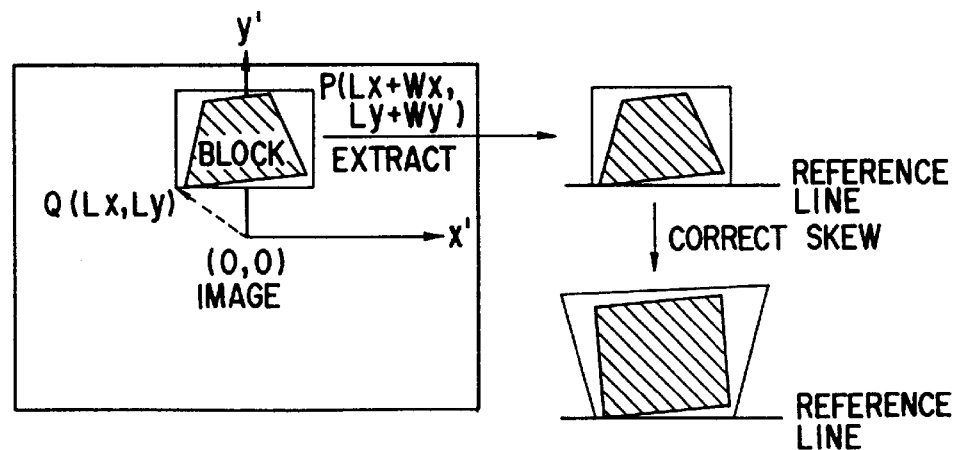
FIG. 9E
FIG. 9F

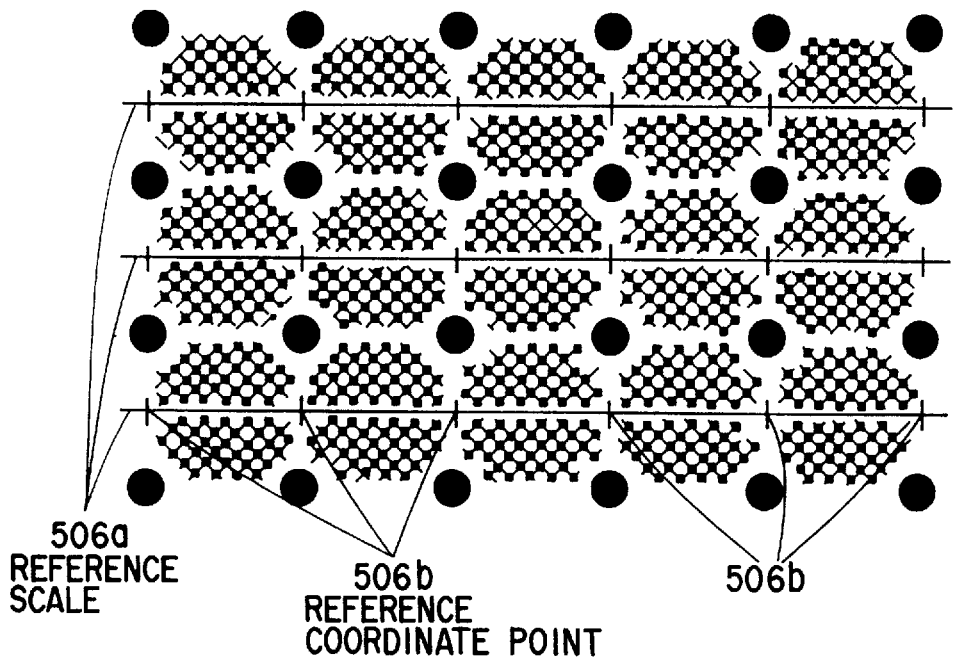
506a REFERENCE SCALE    506b REFERENCE COORDINATE POINT    506b
F I G. 12A
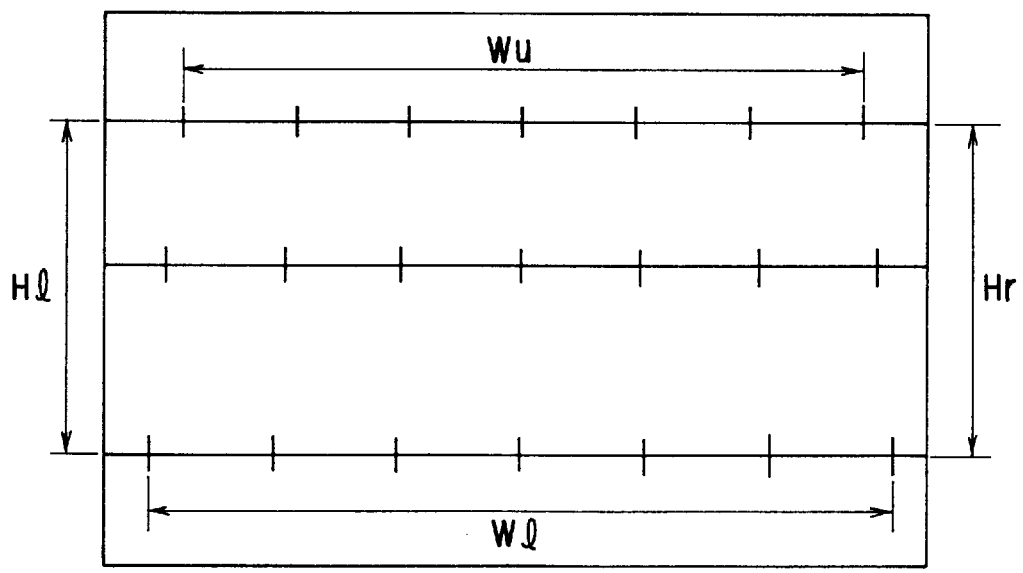
F I G. 12B

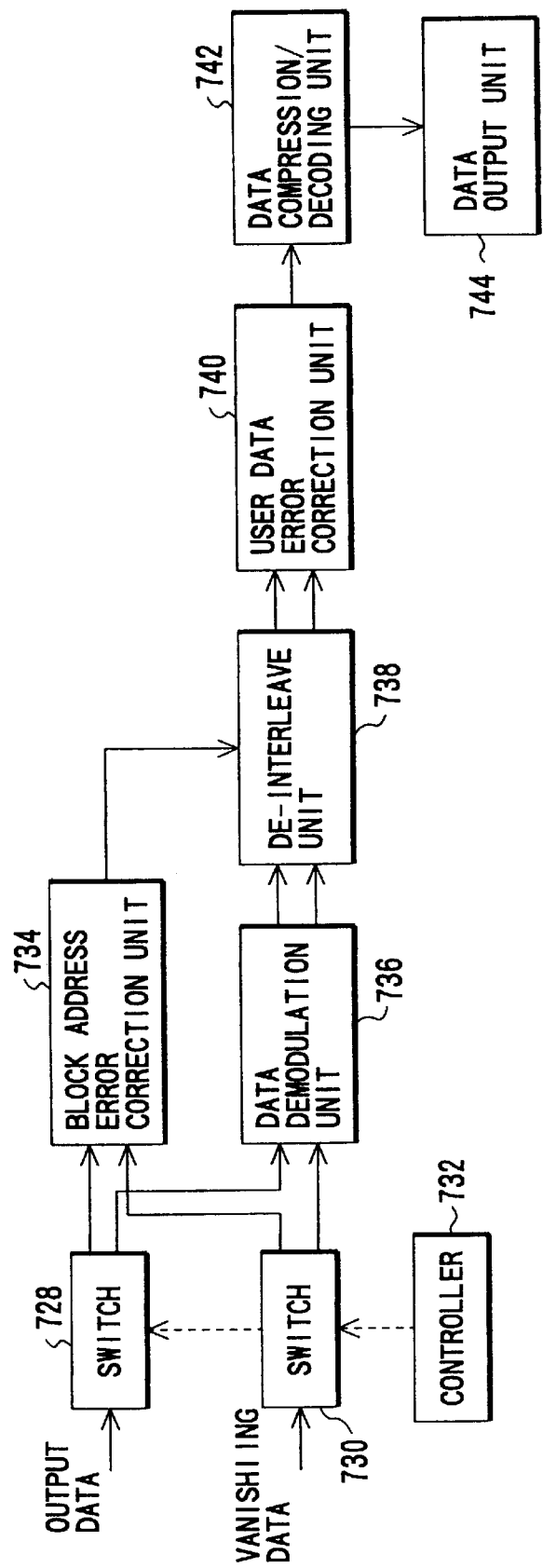
F I G. 15

OPTICAL REPRODUCING SYSTEM FOR MULTIMEDIA INFORMATION RECORDED WITH CODE DATA HAVING FUNCTION FOR CORRECTING IMAGE READING DISTORTION

BACKGROUND OF THE INVENTION

1. Field of the Invention

The present invention generally relates to an information reproducing system and, more particularly, to an information recording medium such as a paper sheet, which records, as an optically readable code pattern, so-called multimedia information including audio information such as voice data, music data, and the like, video information obtained from a camera, video equipment, and the like, and digital code data obtained from a personal computer, wordprocessor, and the like, and an information reproducing apparatus for reproducing original multimedia information by optically reading a code pattern recorded on such information recording medium.

2. Description of the Related Art

As conventional media for recording voice data, music data, and the like, various kinds of media such as a magnetic tape, an optical disk, and the like are known.

However, these media have relatively high prices even when their copies are mass-produced, and require a wide place for storage.

Furthermore, for example, the need for delivering a medium that records voice data to another person at a remote place requires much labor and time even when the medium is delivered via mail or is directly handed over.

The same problems apply to so-called multimedia information as a whole including video information obtained from a camera, video equipment, and the like, and digital code data obtained from a personal computer, wordprocessor, and the like in addition to audio information.

In view of these problems, the assignee of the present application is assigned U.S. Ser. No. 08/407,018 that relates to a system for recording multimedia information including at least one of audio information, video information, and digital code data on an information recording medium such as a paper sheet in the form of a dot code as image information which allows facsimile transmission and can be copied in a large quantity with low cost, i.e., code information, and an information reproducing system for reproducing the code information recorded on the medium.

The information reproducing system according to U.S. Ser. No. 08/407,018 discloses a reading method in which an information reproducing apparatus for optically reading and reproducing a dot code on an information recording medium is held by a hand, and is manually scanned on the recording medium along the recorded dot code.

Also, U.S. Ser. No. 08/542,220 and U.S. Ser. No. 08/571,776 assigned by the assignee of the present application disclose a method of reading the above-mentioned dot code with high accuracy.

An information reproducing system according to U.S. Ser. No. 08/542,220 and U.S. Ser. No. 08/571,776 disclose the following method. That is, a dot code is constituted by a block consisting of markers, a pattern code, a block address, and user data, and by obtaining a block reference point (marker true center) that minimizes any error relating to the positional relationship between pattern dots in the pattern code and the markers, and the positional relationship of optically read pattern dots, the block reference point can be calculated with high accuracy. Using this block reference point, the reading position of the user data can be calculated with high accuracy.

However, even in the information reproducing system according to U.S. Ser. No. 08/542,220 and U.S. Ser. No. 08/571,776, reading errors occur due to the influences of any skew between the reading portion and the recording surface upon manually scanning the information reproducing apparatus that optically reads the dot code, and of any distortion of the optical system itself, as the recording density of the dot code pattern increases.

The information reproducing apparatus and the information recording medium according to U.S. Ser. No. 08/407,018 do not take sufficient measures against such skew and distortion.

SUMMARY OF THE INVENTION

It is, therefore, an object of the present invention to provide a new and improved information recording system in which information recorded in a code pattern can be reliably reproduced even when a skew occurs between the reading portion and the recording surface due to manual scan or the optical system itself has distortion.

According to the present invention, there is provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; and reference coordinate calculation means for calculating a reference coordinate position for determining a data reading coordinate position in a block by approximation using an Nth-degree curve passing centers of a plurality of dots arranged at predetermined relative positions on the image upon extraction of the block as a predetermined unit of data from the code data by processing the code data converted by the conversion means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; weight addition means for adding weights to a plurality of dots arranged at predetermined positions on the basis of a relative positional relationship between a reference coordinate position for determining a data reading coordinate position in a block and center coordinate positions of the plurality of dots upon extraction of the block as a predetermined unit of data from the code data by processing the code data converted by the conversion means; error evaluation value calculation means for calculating error evaluation values between center coordinate positions of the plurality of dots arranged at the predetermined positions and center coordinate positions of a plurality of dots detected on the image corresponding to the plurality of dots; and reference coordinate calculation means for calculating the reference coordinate position that minimizes the error evaluation values calculated by the error evaluation value calculation means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; skew calculation means for calculating a skew between the image pickup means and a code pattern recording surface of the information recording medium on the basis of a relative positional relationship of predetermined reference coordinate positions in the code pattern and a relative positional relationship of reference coordinate positions detected on the image upon extraction of the block as a predetermined unit of data from the code data by processing the code data converted by the conversion means; and correction means for correcting a distorted picked-up image on the image on the basis of the skew calculated by the skew calculation means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; skew calculation means for calculating a skew between the image pickup means and a code pattern recording surface of the information recording medium on the basis of a predetermined size of a reference dot in the code pattern and a size of a reference dot detected on the image upon extraction of the block as a predetermined unit of data from the code data by processing the code data converted by the conversion means; and correction means for correcting a distorted picked-up image on the image on the basis of the skew calculated by the skew calculation means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; data reading coordinate calculation means for calculating a data reading coordinate position indicating a reading position of data in a block at an accuracy higher than a resolution of the image upon extraction of the block as a predetermined unit of data from the code data by processing the code data converted by the conversion means; and discrimination means for determining data and discriminating a degree of accuracy by performing reading using at least one of a pixel value of the data reading coordinate position and a plurality of pixel values around the data reading coordinate position on the basis of the data reading coordinate position calculated by the data reading coordinate calculation means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; marker detection means for detecting a plurality of markers representing boundaries of a block upon extraction of the block as a predetermined unit of data from the code data by processing the code data converted by the conversion means; marker rough center calculation means for calculating rough centers of the markers detected by the marker detection means; pattern code detection means for detecting a pattern code constituted by a plurality of dots with reference to the rough centers of the markers calculated by the marker rough center calculation means; pattern code dot center calculation means for calculating centers of the dots of the pattern code detected by the pattern code detection means; Nth-degree curve approximation calculation means for calculating a curve passing the centers of the dots calculated by the pattern code dot center calculation means by Nth-degree curve approximation; marker true center calculation means for calculating, as a plurality of true centers of the markers, points on the curve that minimize distances between the curve calculated by the Nth-degree curve approximation calculation means and the rough centers of the markers calculated by the marker rough centers calculation means; data reading coordinate calculation means for calculating a data reading coordinate position in the block on the basis of coordinate positions of the plurality of true centers of the markers calculated by the marker true center calculation means; and data reading means for extracting information from a position corresponding to the data reading coordinate position calculated by the data reading coordinate calculation means in the image.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; marker detection means for detecting a plurality of markers representing boundaries of a block upon extraction of the block as a predetermined unit of data from the code data by processing the code data converted by the conversion means; marker rough center calculation means for calculating rough centers of the markers detected by the marker detection means; pattern code detection means for detecting a pattern code constituted by a plurality of dots with reference to the rough centers of the markers calculated by the marker rough center calculation means; pattern code dot center calculation means for calculating centers of the dots of the pattern code detected by the pattern code detection means; pattern code dot weight addition means for adding weights to the dots of the pattern code on the basis of a relative positional relationship between the rough centers of the markers calculated by the marker rough center calculation means and the centers of the dots calculated by the pattern code dot center calculation means; marker true center calculation means for calculating coordinate positions of a plurality of true centers of the markers that minimize evaluation functions representing relative coordinate errors of the center coordinate positions of the dots added with the weights by the pattern code dot weight addition means and center coordinate positions of dots of a predetermined pattern code with respect to the true center coordinate positions of the markers; data reading coordinate calculation means for calculating a data reading coordinate position in the block on the basis of coordinate positions of the plurality of true centers of the markers calculated by the marker true center calculation means; and data reading means for extracting information from a position corresponding to the data reading coordinate position calculated by the data reading coordinate calculation means in the image.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; marker detection means for detecting a plurality of markers representing boundaries of a block upon extraction of the block as a predetermined unit of data from the code data by processing the code data converted by the conversion means; marker rough center calculation means for calculating rough centers of the plurality of markers detected by the marker detection means; skew detection means for detecting a skew of the image on the basis of a positional relationship between the rough centers of the plurality of markers in the image calculated by the marker rough center calculation means; image correction means for correcting the image and the rough centers of the markers calculated by the marker rough center calculation means on the basis of the skew detected by the skew detection means; pattern code detection means for detecting a pattern code constituted by a plurality of dots on the basis of the image and the rough centers of the markers corrected by the image correction means; pattern code dot center calculation means for calculating centers of the dots of the pattern code detected by the pattern code detection means; marker true center calculation means for calculating coordinate positions of a plurality of true centers of the markers that minimize evaluation functions representing relative coordinate errors of the center coordinate positions of the dots of the pattern code calculated by the pattern code dot center calculation means and center coordinate positions of dots of a predetermined pattern code with respect to the true center coordinate positions of the markers; data reading coordinate calculation means for calculating a data reading coordinate position in the block on the basis of coordinate positions of the plurality of true centers of the markers calculated by the marker true center calculation means; and data reading means for extracting information from a position corresponding to the data reading coordinate position calculated by the data reading coordinate calculation means in the image corrected by the image correction means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; block boundary line extraction means for extracting a plurality of boundary lines of a block recorded on a code pattern recording surface of the information recording medium upon extraction of the block as a predetermined unit of data from the code data by processing the code data converted by the conversion means; block deformation amount estimation means for estimating a deformation amount of the block on the basis of the plurality of block boundary lines of the block extracted by the block boundary line extraction means; image correction means for correcting the image and the boundary lines of the block on the basis of the deformation amount of the block estimated by the block deformation amount estimation means; data reading coordinate calculation means for calculating a data reading coordinate position on the basis of the boundary lines of the block corrected by the image correction means; and data reading means for extracting information from a position corresponding to the data reading coordinate position calculated by the data reading coordinate calculation means in the image corrected by the image correction means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; reference scale extraction means for extracting a reference scale recorded on a code pattern recording surface of the information recording medium, which scale is used for detecting a skew between the image pickup means and the code pattern recording surface upon extraction of the block as a predetermined unit of data from the code data by processing the code data converted by the conversion means; image deformation amount estimation means for estimating a distortion amount of the image on the basis of a distortion of the reference scale extracted by the reference scale extraction means; image correction means for correcting the image on the basis of the distortion amount estimated by the image deformation amount estimation means; marker detection means for detecting a plurality of markers representing boundaries of the block from the image corrected by the image correction means; marker rough center calculation means for calculating rough centers of the markers detected by the marker detection means; pattern code detection means for detecting a pattern code constituted by a plurality of dots with reference to the rough centers of the markers calculated by the marker rough center calculation means; pattern code dot center calculation means for calculating centers of the dots of the pattern code detected by the pattern code detection means; marker true center calculation means for calculating a plurality of true center coordinate positions of the markers that minimize evaluation functions representing relative coordinate errors of the center coordinate positions of the dots of the pattern code calculated by the pattern code dot center calculation means and center coordinate positions of dots of a predetermined pattern code with respect to the true center coordinate positions of the markers; data reading coordinate calculation means for calculating a data reading coordinate position in the block on the basis of the coordinate positions of the plurality of true centers of the markers calculated by the marker true center calculation means; and data reading means for extracting information from a position corresponding to the data reading coordinate position calculated by the data reading coordinate calculation means in the image corrected by the image correction means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; marker detection means for detecting a plurality of markers representing boundaries of a block upon extraction of the block as a predetermined unit of data from the code data by processing the code data converted by the conversion means; marker rough center calculation means for calculating rough centers of the markers detected by the marker detection means; marker deformation amount calculation means for calculating a plurality of marker deformation amounts by detecting distances from the rough centers of the markers calculated by the marker rough center calculation means to outer peripheries of the markers; block deformation amount estimation means for estimating a deformation amount of the block on the basis of the plurality of marker deformation amount calculated by the marker deformation amount calculation means; image correction means for correcting the image and positions of the rough centers of the markers on the basis of the deformation amount of the block estimated by the block deformation amount estimation means; pattern code detection means for detecting a pattern code constituted by a plurality of dots on the basis of the image and the positions of the rough centers of the markers corrected by the image correction means; pattern code dot center calculation means for calculating centers of the dots of the pattern code detected by the pattern code detection means; marker true center calculation means for calculating coordinate positions of a plurality of true centers of the markers that minimize evaluation functions representing relative coordinate errors of the center coordinate positions of the dots of the pattern code calculated by the pattern code dot center calculation means and center coordinate positions of dots of a predetermined pattern code with respect to the true center coordinate positions of the markers; data reading coordinate calculation means for calculating a data reading coordinate position in the block on the basis of the coordinate positions of the plurality of true centers of the markers calculated by the marker true center calculation means; and data reading means for extracting information from a position corresponding to the data reading coordinate position calculated by the data reading coordinate calculation means in the image corrected by the image correction means.

According to the present invention, there is also provided an information reproducing apparatus comprising: image pickup means for optically reading, from an information recording medium which comprises a portion that records multimedia information including at least one of audio information, video information, and digital code data in the form of an optically readable code pattern, the code pattern; conversion means for converting the code pattern read by the image pickup means into code data as an image; marker detection means for detecting a plurality of markers representing boundaries of a block upon extraction of the block as a predetermined unit of data from the code data by processing the code data converted by the conversion means; marker rough center calculation means for calculating rough centers of the markers detected by the marker detection means; pattern code detection means for detecting a pattern code constituted by a plurality of dots with reference to the rough centers of the markers calculated by the marker rough center calculation means; pattern code dot center calculation means for calculating centers of the dots of the pattern code detected by the pattern code detection means; marker true center calculation means for calculating coordinate positions of a plurality of true centers of the markers that minimize evaluation functions representing relative coordinate errors of the center coordinate positions of the dots of the pattern code calculated by the pattern code dot center calculation means and center coordinate positions of dots of a predetermined pattern code with respect to the true center coordinate positions of the markers; data reading coordinate calculation means for calculating a data reading coordinate position in the block on the basis of the coordinate positions of the plurality of true centers of the markers calculated by the marker true center calculation means; data reading coordinate discrimination means for discriminating whether the data reading coordinate position calculated by the data reading coordinate calculation means indicates a center or boundary of a pixel constituting the image by performing a calculation at an accuracy not less than a predetermined multiple of the pixel constituting the image; reading pixel black/white discrimination means for, when the data reading coordinate discrimination means determines that the data reading coordinate position indicates the center of the pixel constituting the image, extracting information from one pixel on the image indicated by the data reading coordinate position; and reading surrounding pixel black/white discrimination means for, when the data reading coordinate discrimination means determines that the data reading coordinate position indicates the boundary of the pixel constituting the image, extracting information from a plurality of pixels contacting the boundary indicated by the data reading coordinate position and discriminating vanishing data indicating whether or not information is indefinite.

According to the present invention, there is also provided an information recording medium comprising: a portion that records multimedia information including at least one of audio information, video information, and digital code data in the form of an optically readable code pattern; and a reference scale used for detecting a skew of the code pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a block diagram showing the arrangement of an information reproducing apparatus according to the third embodiment of the present invention;

FIGS. 9A to 9F are views for explaining the block boundary line extraction of a block boundary line extraction unit and the processing of a block deformation estimation unit in the fourth embodiment;

FIGS. 12A and 12B are views for explaining the reference scale extraction of a reference scale extraction unit and the deformation amount calculation method of an image deformation estimation unit in the fifth embodiment;

FIG. 15 is a block diagram showing the arrangement of the information reproducing apparatus of the seventh embodiment.

DETAILED DESCRIPTION OF THE PREFERRED EMBODIMENTS

Figure 1:
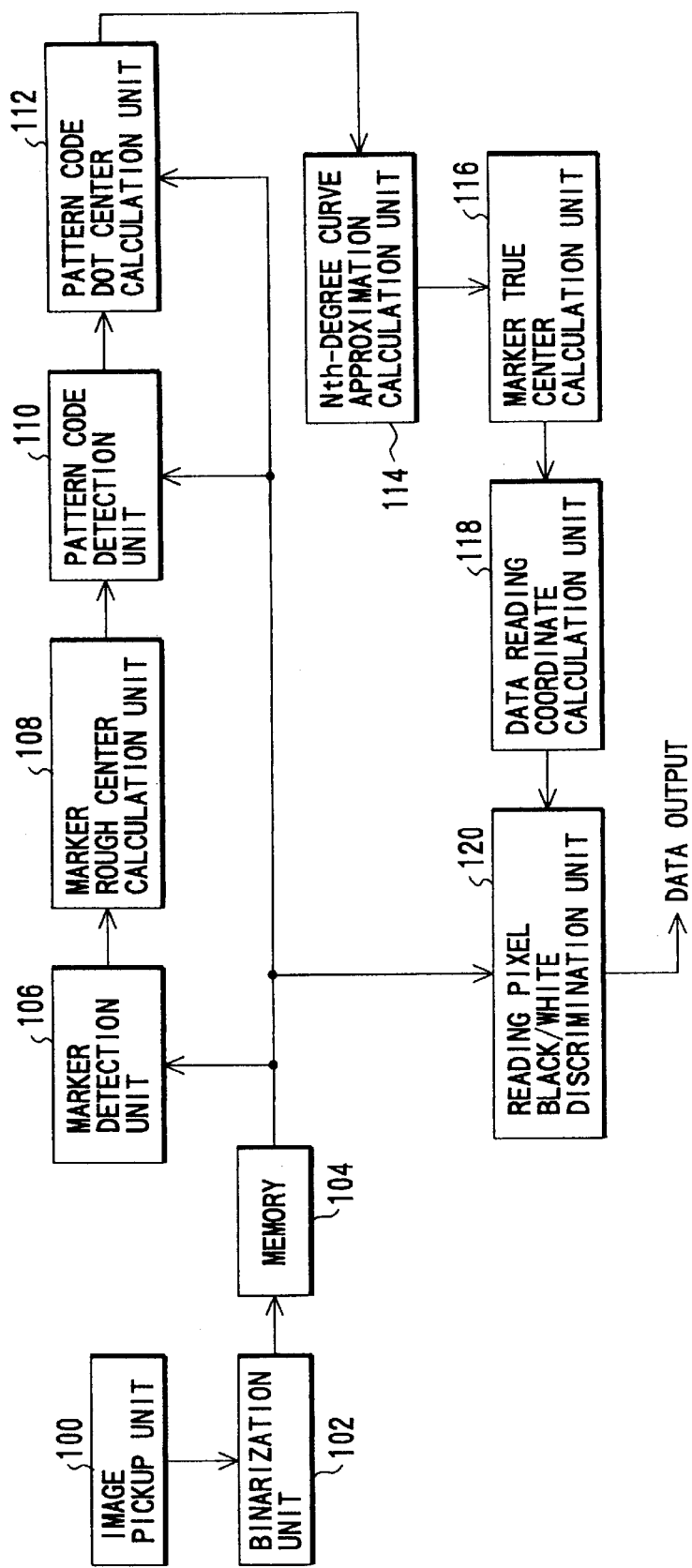
FIG. 1 is a block diagram showing the arrangement of an information reproducing apparatus according to the first embodiment of the present invention.

Reference will now be made in detail to the presently preferred embodiments of the invention as illustrated in the accompanying drawings, in which like reference characters designate like or corresponding parts throughout the several drawings.

Prior to a description of the preferred embodiments of the present invention, a code pattern of a dot code used in the present invention and a dot code reading means in an information reproducing apparatus according to a basic example of the present invention will be explained below to help understand the present invention.

Figure 2A:
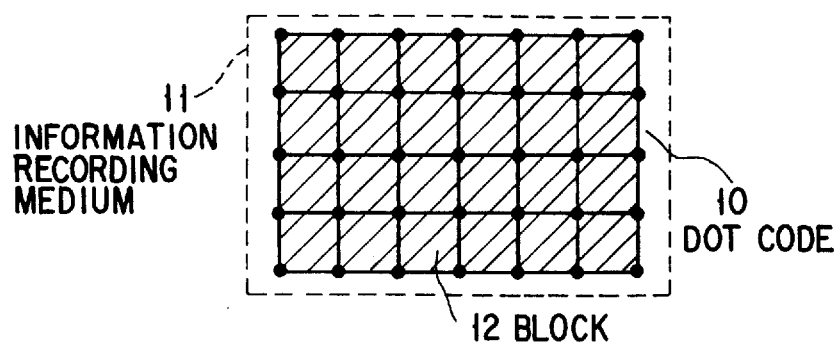
FIGS. 2A, 2B, and 2C are views showing the arrangement of a code pattern of a dot code used in the present invention.
Figure 2B:
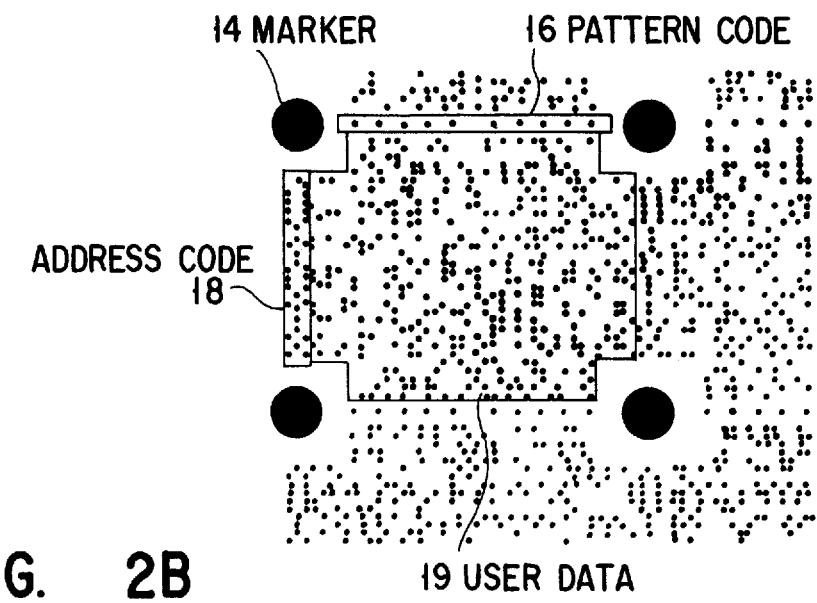

FIGS. 2A and 2B are views showing the arrangement of a code pattern of a dot code used in the present invention.

As shown in FIG. 2A, a dot code 10 is recorded on an information recording medium 11 comprising a portion where multimedia information including at least one of audio information, video information, and digital code data is recorded as an optically readable code pattern. The dot code 10 is constituted by arranging blocks 12 each consisting of a plurality of dots arranged in correspondence with the contents of data.

In other words, the dot code 10 is constituted by arranging a set of a plurality of blocks 12 as predetermined unit data.

One block 12 consists of markers 14, a pattern code 16, an address code 18, and user data 19, as shown in FIG. 2B.

The blocks 12 constituting the dot code 10 are two-dimensionally arranged, and address codes 18 are appended to the respective blocks 12.

The address codes 18 are assigned serial numbers of the blocks 12.

For example, if "1" represents the address of the lowermost left block in the dot code 10 shown in FIG. 2A, the address of the second lowermost left block is 2, the address of the third lowermost left block is 3, and so on.

These serial numbers represent the order of data when user data 19 are re-constructed in units of blocks.

The markers 14 are arranged so that the four corner points of each block 12 match the centers of the markers 14. The markers 14 are used in discrimination of the block area.

In the dot code 10 shown in FIG. 2A, the blocks 12 are arranged at high density, and all the markers except for those located at the four corners of the dot code 10 are commonly used by a plurality of blocks.

These markers 14 are used for roughly calculating the position of the boundary of each block 12.

The pattern code 16 is arranged on the upper or lower side of the block 12, and is used for calculating the coordinate positions of the four corner points (the central coordinate positions of the markers 14) of the block 12 with high accuracy.

Figure 3:
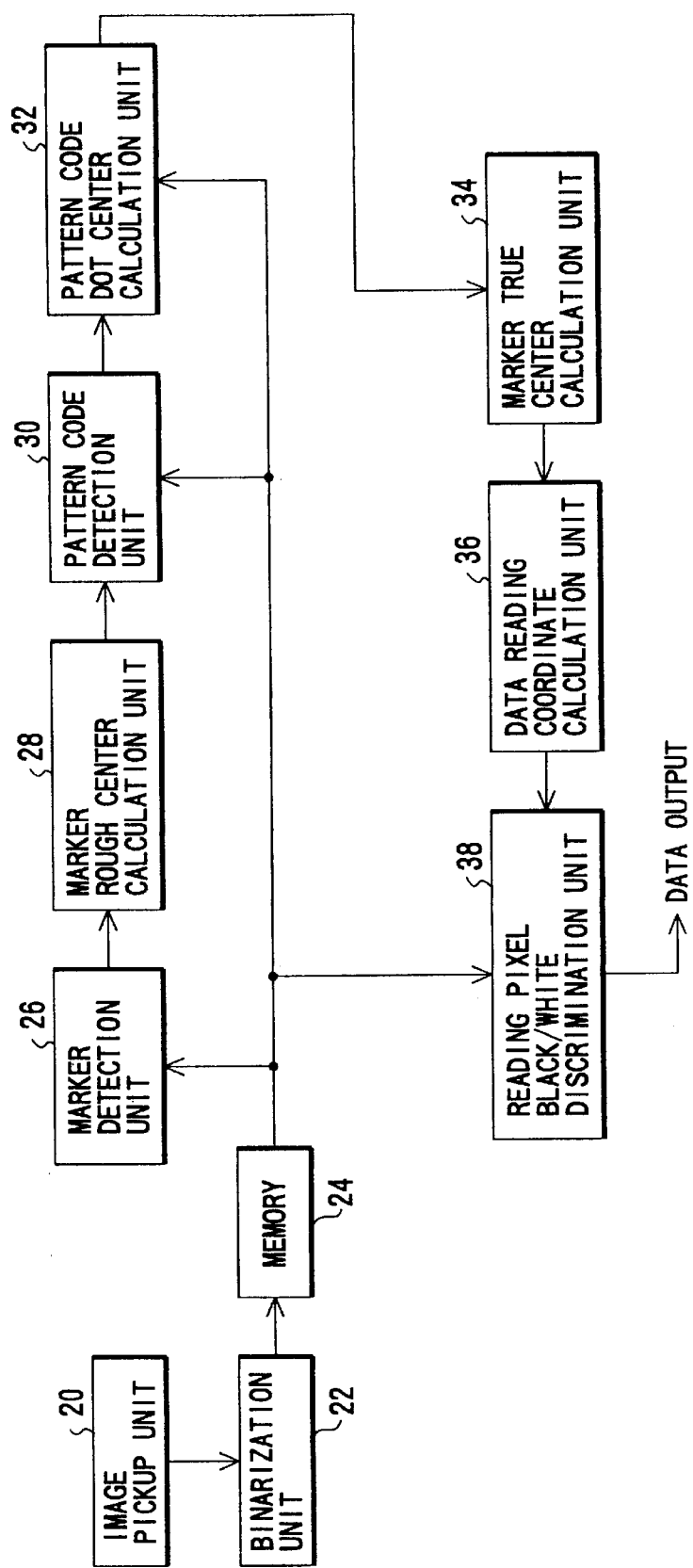
FIG. 3 is a block diagram showing the arrangement of an information reproducing apparatus according to a basic example of the present invention.

FIG. 3 is a block diagram showing the arrangement of an information reproducing apparatus according to a basic example of the present invention.

Referring to FIG. 3, assume that an image pickup unit 20 comprises, e.g., an optical system and a charge coupled device (CCD) so as to read the above-mentioned dot code 10 recorded on the information recording medium 11.

An image of the dot code 10 picked up by the image pickup unit 20 is binarized by a binarization unit 22, and is stored in a memory 24 as binary image code data.

A marker detection unit 26 extracts only markers 14 from the binary image code data stored in the memory 24.

As the extraction technique of markers 14, erosion processing and labeling processing are used.

In the erosion processing, when a mask with a predetermined size, e.g., a 3×3 pixel mask, is applied to a pixel of interest, if all the pixels in the mask are black pixels, the pixel of interest is converted into a black pixel; if the pixels in the mask include at least one white pixel, the pixel of interest is converted into a white pixel.

When such erosion processing is performed for the binary image recorded on the memory 24, the pattern code 16, the address code 18, and the user data 19, which are constituted by small dots, disappear, and only the areas of the markers 14 can be left.

Thereafter, the remaining pixels are sequentially labeled in units of groups, and existing areas assigned identical labels are obtained. The existing areas are enlarged since they are degenerated by the erosion processing, and the enlarged areas are determined as marker existing areas.

A marker rough center calculation unit 28 calculates the barycentric positions of black pixels in units of marker existing areas, and determine these positions as marker rough centers, which are used as reference points upon reading the pattern code 16.

Figure 2C:
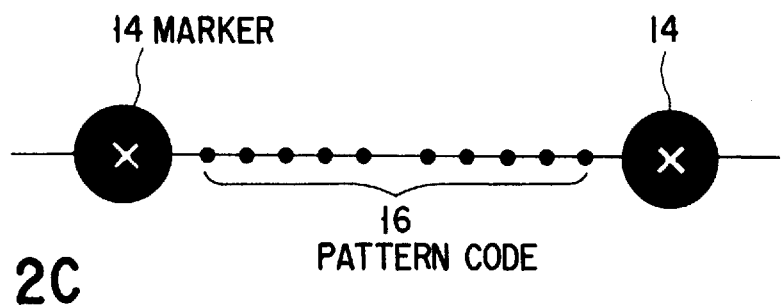

A pattern code detection unit 30 searches a region around a line segment connecting the rough centers of a pair of markers 14, as shown in FIG. 2C, so as to detect groups of black pixels.

A pattern code dot center calculation unit 32 calculates the barycentric positions of the detected groups of black pixels as the dots of the pattern code 16, and determines these positions as pattern dot centers, which are used as reference points upon calculation of block reference points (marker true central coordinate positions).

A marker true center calculation unit 34 calculates marker centers that can minimize errors of relative coordinate positions of the marker rough centers and errors of relative coordinate positions of the group of calculated pattern dot centers, and determines the calculated marker centers as marker true centers, which are used as reference points upon reading the address code 18 and the user data 19.

A data reading coordinate calculation unit 36 equally divides four line segments which connect the marker true centers located at the four corners of one block 12 and serve as the boundaries of a block, and determines, as a data reading coordinate position, an intersection at which line segments obtained by connecting corresponding divided points of two pairs of opposing line segments cross each other.

A reading pixel black/white discrimination unit 38 initially reads the corresponding pixel positions of the address code 18 of the image recorded on the memory 24 in correspondence with the data reading coordinate position.

Upon completion of reading the corresponding pixel positions of the address code 18, the reading pixel black/white discrimination unit 38 performs address error correction, and subsequently, reads pixel positions, corresponding to the data reading coordinate position, of the user data 19 of the recorded image.

The reading pixel black/white discrimination unit 38 then outputs the read data of the user data 19 to another data memory (not shown) together with the read data of the address code 18.

When the read data of the user data 19 is subjected to modulation upon recording, the reading pixel black/white discrimination unit 38 demodulates the data and stores the demodulated data in the memory.

On the other hand, when the pixel position of the image recorded on the memory 24 corresponds to a white pixel, the reading pixel black/white discrimination unit 38 outputs bit "0"; when the pixel position corresponds to a black pixel, the unit 38 outputs bit "1".

The dot code used in the present invention and the dot code reading means in the information reproducing apparatus according to the basic example of the present invention have been described briefly.

However, the dot code reading means in the information reproducing apparatus according to the basic example cannot often calculate the marker true centers with high accuracy when the read dot code is distorted. Consequently, the above-mentioned dot code reading means has limitations as to its data reading accuracy.

Some embodiments of the present invention, which improve the basic example in consideration of the above-mentioned problem, will be described below with reference to the accompanying drawings.

FIG. 1 is a block diagram showing the arrangement of an information reproducing apparatus according to the first embodiment of the present invention.

Referring to FIG. 1, an image of a dot code 10 (see FIG. 2A; the same applies to the following description) optically picked up by an image pickup unit 100 is binarized by a binarization unit 102, and is stored as binary image code data in a memory 104.

A marker detection unit 106 detects markers 14 on the basis of the binary image code data stored in the memory 104.

As the detection technique of the markers 14, the same method as described above is used.

A marker rough center calculation unit 108 calculates the barycentric positions of the markers 14 on the basis of the areas of the markers 14 detected based on the binary image code data stored in the memory 104, and determines these positions as marker rough centers.

A pattern code detection unit 110 detects dots in a pattern code 16 (see FIG. 2B; the same applies to the following description) sandwiched between a pair of markers calculated by the marker rough center calculation unit 108 on the basis of the binary image code data stored in the memory 104.

Subsequently, a pattern code dot center calculation unit 112 calculates the barycentric positions of groups of black pixels of the pattern code dot areas detected by the pattern code detection unit 110, and determines these positions as pattern dot centers.

Assuming that a plurality of pattern dot central positions calculated between the pair of markers by the pattern code dot center calculation unit 112 are located on an Nth-degree curve, e.g., a quadratic or cubic curve, an Nth-degree curve approximation calculation unit 114 calculates a formula of the curve that minimizes square errors of the distances between the pattern dot central positions and the Nth-degree curve.

For example, a cubic curve is defined as follows:

$$f(x) = ax^3 + bx^2 + cx + d \tag{1}$$

In this case, the following simultaneous equations determine coefficients a, b, and c:

$$dn + c\sum_{i=1}^{n} x_i + b\sum_{i=1}^{n} x_i^2 + a\sum_{i=1}^{n} x_i^3 = \sum_{i=1}^{n} y_i, \tag{2}$$

$$d\sum_{i=1}^{n} x_i + c\sum_{i=1}^{n} x_i^2 + b\sum_{i=1}^{n} x_i^3 + a\sum_{i=1}^{n} x_i^4 = \sum_{i=1}^{n} y_i x_i,$$

$$d\sum_{i=1}^{n} x_i^2 + c\sum_{i=1}^{n} x_i^3 + b\sum_{i=1}^{n} x_i^4 + a\sum_{i=1}^{n} x_i^5 = \sum_{i=1}^{n} y_i x_i^2,$$

$$d\sum_{i=1}^{n} x_i^3 + c\sum_{i=1}^{n} x_i^4 + b\sum_{i=1}^{n} x_i^5 + a\sum_{i=1}^{n} x_i^6 = \sum_{i=1}^{n} y_i x_i^3$$

A marker true center calculation unit 116 calculates points that minimize the distances between the points on this cubic curve and the marker rough centers, and determines these points as marker true centers.

The method of calculating the marker true centers will be described in detail below.

The square of the distance, D, between the point on the cubic curve and the marker rough center can be expressed as follows:

$$D^2 = (X-x)^2 + (Y-f(X))^2 \tag{3}$$

When the differential of the square of the distance D for X yields 0, the distance is minimized.

This is explained as follows. Note that (X, Y) represents the marker rough center.

$$\frac{dD^2}{dx} = g(x) = 2(X-x) + 2f'(x)(Y-f(x)) = 0 \tag{4}$$

Equation (4) is rewritten as the following quintic equation:

$$g(x) = \alpha x^5 + \beta x^4 + \gamma x^3 + \delta x^2 + \epsilon x + \zeta = 0 \tag{5}$$

where $$\alpha = 3a^2, \beta = 5ab, \gamma = 4ac + 2b^2, \delta = 3(ad + bc - aY),$$

$\epsilon = 2bd - 2bY + 1, \zeta = cd - X - cY.$

The solution of this equation can be calculated using, e.g., the Newton-Raphson's method.

In this case, if the x-coordinate of the marker rough center is selected as an initial value, since the x-coordinate is present in the vicinity of the solution of the above equation, sufficiently high accuracy can be assured even when the number of repetitions is fixed to be two or three.

The Newton-Raphson's method will be described below.

More specifically, equation (6) below is repetitively calculated, and $X_{n+1}$ that satisfies "$|X_{n+1} - X_n| < D$" is determined as the solution of the equation (where n is a natural number).

$$X_{n+1} = X_n - \frac{g(X_n)}{g'(X_n)} \quad (6)$$

A data reading coordinate calculation unit 118 obtains boundary line segments of a block by connecting the calculated marker true center coordinate positions corresponding to the four corners of the block, and calculates equally dividing points that equally divide these line segments into segments corresponding to a predetermined number of samples.

The data reading coordinate calculation unit 118 connects, in turn, the equally dividing points of the two pairs of opposing boundary line segments of the block in the order from points nearer the marker true centers.

The data reading coordinate calculation unit 118 outputs intersections of these line segments to a reading pixel black/white discrimination unit 120 as data reading coordinate positions.

The reading pixel black/white discrimination unit 120 discriminates whether each of pixels, corresponding to the data reading coordinate positions calculated by the data reading coordinate calculation unit 118, of the binary image code data stored in the memory 104 is a black or white pixel.

The reading pixel black/white discrimination unit 120 outputs bit "0" when it determines a white pixel; bit "1" when it determines a black pixel.

The reading pixel black/white discrimination unit 120 reads data in the order of an address code 18 and user data 19.

Data read by the reading pixel black/white discrimination unit 120 are sequentially output to an address error correction unit and a data demodulation unit (neither are shown).

As described above, according to the first embodiment, upon extraction of blocks as predetermined units of data from binary image code data, reference coordinate positions that determine the data reading coordinate positions in each block are calculated by approximation using an Nth-degree curve passing the centers of a plurality of dots arranged at predetermined relative positions on the image. With this processing, even when the picked-up image of the dot code is distorted, the marker true centers can be calculated with higher accuracy, and hence, the data reading positions can be accurately calculated.

Figure 4:
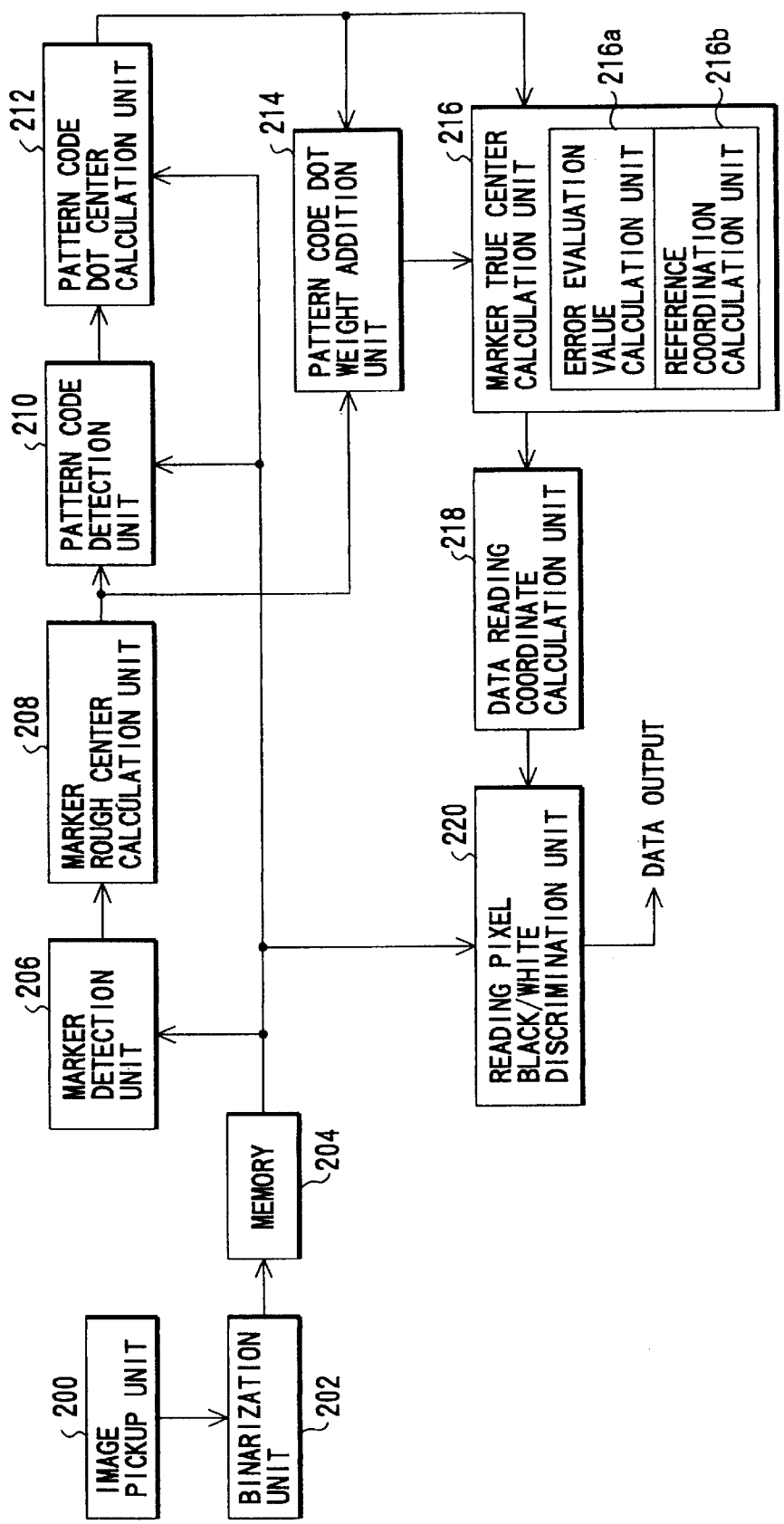
FIG. 4 is a block diagram showing the arrangement of an information reproducing apparatus according to the second embodiment of the present invention.

FIG. 4 is a block diagram showing the arrangement of an information reproducing apparatus according to the second embodiment of the present invention.

Referring to FIG. 4, an image of a dot code 10 optically picked up by an image pickup unit 200 is binarized by a binarization unit 202, and is stored as binary image code data in a memory 204.

A marker detection unit 206 detects markers 14 on the basis of the binary image code data stored in the memory 204.

As the detection technique of the markers 14, the same method as described above is used.

A marker rough center calculation unit 208 calculates the barycentric positions of the markers 14 on the basis of the areas of the markers 14 detected based on the binary image code data stored in the memory 204, and determines these positions as marker rough centers.

A pattern code detection unit 210 detects dots (pattern code dots) in a pattern code 16 sandwiched between a pair of markers calculated by the marker rough center calculation unit 208 on the basis of the binary image code data stored in the memory 204.

Subsequently, a pattern code dot center calculation unit 212 calculates the barycentric positions of groups of black pixels of the pattern code dot areas detected by the pattern code detection unit 210, and determines these positions as pattern dot centers.

A pattern code dot weight addition unit 214 calculates the distances between the coordinate position of the marker rough center and the plurality of pattern dot center coordinate positions.

Note that the distance may be a square distance or may be defined by $|X - x_i| + |Y - y_i|$.

In this case, (X, Y) represents the marker rough center coordinate position, and (xi, yi) represents the ith pattern code dot center position.

The pattern code dot weight addition unit 214 weights the respective pattern code dots depending on the values of the distances between the coordinate position of the marker rough center and the plurality of pattern dot center coordinate positions.

For example, if this distance is less than 1, the unit 214 adds a weight "10"; if this distance is equal to or larger than 1 and less than 2, the unit 214 adds a weight "8".

A marker true center calculation unit 216 includes an error evaluation value calculation unit 216a and a reference coordinate calculation unit 216b, receives the weight data added by the pattern code dot weight addition unit 214, and the pattern code center coordinate positions, and calculates marker true centers (reference coordinate positions) that minimize square errors (evaluation functions) to basis vectors using the error evaluation value calculation unit 216a.

A square error (evaluation function) E by the error evaluation value calculation unit 216a is defined as follows:

$$E = \sum_{i=1}^{n} \omega_i \{(x_i' - x_i)^2 + (y_i' - y_i)^2\} \quad (7)$$
$$= \sum_{i=1}^{n} \omega_i \{(x_m' + \Delta x_i e_x' - x_i)^2 + (y_m' + \Delta y_i e_y' - y_i)^2\}$$

where $\omega_i$ is the ith weight of the pattern code dot, (xm', ym') is the marker true center coordinate position, ex' and ey' are unit vectors, and $\Delta x_i$ and $\Delta y_i$ are relative positions of the pattern dot center coordinate position (xi, yi) from the marker rough center.

In order to minimize the evaluation function E, the following four partial differentials must yield "0".

$$\frac{\partial E}{\partial x_m'} = 0, \frac{\partial E}{\partial e_x'} = 0, \frac{\partial E}{\partial y_m'} = 0, \frac{\partial E}{\partial e_y'} = 0 \quad (8)$$

From four equations (8), the marker true center can be calculated by the following equations (9):

$$x_m' = \frac{\sum_{n=1}^{n} \omega_i \Delta x_i^2 \sum_{n=1}^{n} \omega_i x_i - \sum_{n=1}^{n} \omega_i \Delta x_i \sum_{n=1}^{n} \omega_i \Delta x_i x_i}{\sum_{n=1}^{n} \omega_i \Delta x_i^2 \sum_{n=1}^{n} \omega_i - \sum_{n=1}^{n} \omega_i \Delta x_i \sum_{n=1}^{n} \omega_i \Delta x_i},$$

$$y_m' = \frac{\sum_{n=1}^{n} \omega_i \Delta y_i^2 \sum_{n=1}^{n} \omega_i y_i - \sum_{n=1}^{n} \omega_i \Delta y_i \sum_{n=1}^{n} \omega_i \Delta y_i y_i}{\sum_{n=1}^{n} \omega_i \Delta y_i^2 \sum_{n=1}^{n} \omega_i - \sum_{n=1}^{n} \omega_i \Delta y_i \sum_{n=1}^{n} \omega_i \Delta y_i}$$

(9)

A data reading coordinate calculation unit 218 obtains boundary line segments of a block by connecting the calculated marker true center coordinate positions corresponding to the four corners of the block, and calculates equally dividing points that equally divide each line segment into a predetermined number of line segments.

The data reading coordinate calculation unit 218 connects, in turn, the equally dividing points of the two pairs of opposing boundary line segments of the block in the order from points nearer the marker true centers.

The data reading coordinate calculation unit 218 outputs intersections of these line segments to a reading pixel black/white discrimination unit 220 as data reading coordinate positions.

The reading pixel black/white discrimination unit 220 discriminates whether each of pixels, corresponding to the data reading coordinate positions calculated by the data reading coordinate calculation unit 218, of the binary image code data stored in the memory 204 is a black or white pixel.

The reading pixel black/white discrimination unit 220 outputs bit "0" when it determines a white pixel; bit "1" when it determines a black pixel.

The reading pixel black/white discrimination unit 220 reads data in the order of an address code 18 and user data 19.

Data read by the reading pixel black/white discrimination unit 220 are sequentially output to an address error correction unit and a data demodulation unit (neither are shown).

As described above, according to the second embodiment, since the marker true centers are calculated while placing an importance on pattern code dots in the vicinity of the markers, even when the picked-up image of the dot code is distorted, the marker true centers can be calculated with higher accuracy, and hence, the data reading positions can be accurately calculated.

FIG. 5 is a block diagram showing the arrangement of an information reproducing apparatus according to the third embodiment of the present invention.

Referring to FIG. 5, an image of a dot code 10 optically picked up by an image pickup unit 300 is stored in a memory 302 as multi-valued image data.

The multi-valued image data stored in the memory 302 is binarized by a binarization unit 304, and is stored as binary image code data in a memory 306.

A marker detection unit 308 detects markers 14 on the basis of the binary image code data stored in the memory 306.

As the detection technique of the markers 14, the same method as described above is used.

A marker rough center calculation unit 310 calculates the barycentric positions of the markers 14 on the basis of the areas of the markers 14 detected based on the binary image code data, and determines these positions as marker rough centers.

A skew detection unit 312 receives the coordinate positions of the marker rough centers of the plurality of markers 14 of the binary image code data stored in the memory 306, detects any skew of the image pickup unit 300 with respect to the dot code recording surface on the basis of the positional relationship of these marker rough centers, and outputs the detected skew to an image correction unit 314.

Figure 6A:
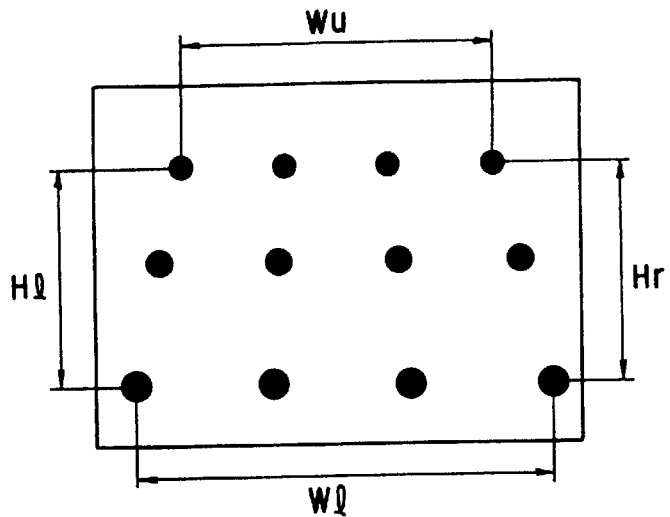
FIGS. 6A, 6B, and 6C are views for explaining the skew detection method of a skew detection unit and the projection conversion as skew correction of an image correction unit in the third embodiment.

In this skew detection, as shown in FIG. 6A, a ratio Wu/W between the horizontal interval, Wu, between the marker rough centers at the upper end of the image, and the horizontal interval, W, between the marker rough centers at the lower end, and a ratio Hr/H between the vertical interval, Hr, between the marker rough centers at the right end, and the vertical interval, H, between the marker rough centers at the left end are calculated, thereby calculating skews in the horizontal and vertical directions.

Note that the relationship between the skew and the horizontal or vertical interval ratio is calculated in advance and is stored in a ROM table (not shown) in the skew detection unit 312.

At this time, the scale of the ROM table depends on the accuracy of the skew to be detected.

The image correction unit 314 receives the skews, in the horizontal and vertical directions, corresponding to the two ratios from the ROM table in the skew detection unit 312, and performs projection conversion for the multi-valued image data stored in the memory 302 and the marker rough center coordinate positions from the marker rough center calculation unit 310 so as to cancel the skews in the horizontal and vertical directions.

This projection conversion is performed according to the following equations (10):

$$x' = \frac{Dx \cos^2 \phi}{D\cos \phi + (x\cos \phi + L) \sin \phi},$$

$$y' = \frac{Dy \cos^2 \phi}{D\cos \phi + (x\cos \phi + L) \sin \phi},$$

$$x'' = \frac{aD'}{D} x',$$

$$y'' = \frac{bD'}{D} y'$$

(10)

where x" and y" are the coordinates on the picked-up image, x' and y' are the coordinates on the plane of the distal end of the image pickup unit 300, and x and y are the coordinates on the dot code recording surface.

The picked-up image is projection-converted onto the dot code recording surface, thus generating a corrected image.

On the other hand, a skew φ represents the skew between the plane that contacts the distal end of the image pickup unit 300 in the x-direction, and the dot code recording surface, a distance D represents the distance from the distal end of the image pickup unit 300 to its lens, D' represents the focal length of the lens, and a and b are coefficients for converting the length D" to those corresponding to the resolutions, in the x- and y-directions, of the CCD in the image pickup unit 300.

Figures 6B, 6C:
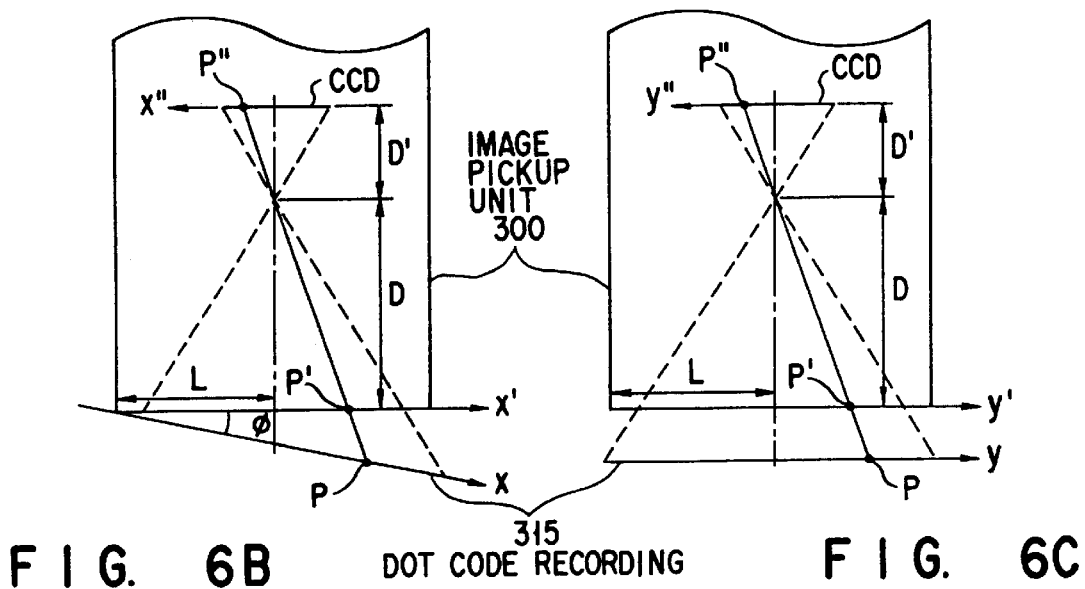

FIGS. 6B and 6C are views for explaining the projection conversion. FIG. 6B is a view when a point P is viewed from the y-direction, and FIG. 6C is a view when the point P is viewed from the x-direction.

The projection conversion is performed in the following procedure.

The directions of the skews between the image pickup unit 300 and a dot code recording surface 315 are discriminated by the skew detection unit 312.

Furthermore, the image correction unit 314 performs rotation processing of the picked-up image data stored in the memory 302, so that the skews can be defined based on only the x-direction.

In this rotation processing, assume that the distal end shape of the image pickup unit 300 is a rectangular shape, and one side of this rectangle contacts the dot code recording surface.

Thus, the directions of the skews can be considered as 0°, 90°, 180°, or 270° with respect to the x-direction, and the picked-up image can be rotated by simple processing, i.e., by replacing the coordinate axes and adding signs + and –.

Upon completion of the rotation processing, the image correction unit 314 calculates the picked-up image coordinates (x", y") with respect to the corrected image coordinates (x, y) using equations (10) above.

At this time, the picked-up image is constituted by pixels, and the picked-up image coordinates can only assume discrete values.

For this reason, when the coordinates (x", y") obtained using equations (10) above are other than a discrete coordinate value, the image correction unit 314 interpolates a picked-up image G(x", y") using the pixel values of a plurality of neighboring discrete coordinate values, thus obtaining a corrected image F(x,y).

Note that the interpolation may be attained by linear interpolation or spline interpolation.

For example, the linear interpolation using four neighboring pixels is performed as follows.

Figure 7:
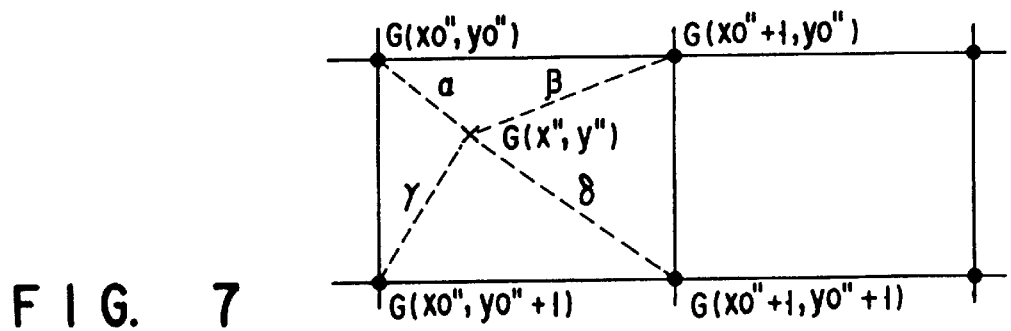
FIG. 7 is a view showing linear interpolation using four neighboring pixels in the projection conversion.

FIG. 7 is a view showing the linear interpolation using four neighboring pixels.

In FIG. 7, x0" and y0" are values obtained by rounding off digits below the decimal point of x" and y", and $\alpha$, $\beta$, $\gamma$, and $\delta$ are the ratio of the distance between the coordinates (x", y") and (x0", y0"), the ratio of the distance between the coordinates (x", y") and (x0"+1, y0"), the ratio of the distance between the coordinates (x", y") and (x0", y0"+1), and the ratio of the distance between the coordinates (x", y") and (x0"+1, y0"+1) respectively.

$$F(x,y) = G(x",y") \qquad (11)$$
$$= \{\beta\gamma\delta G(x_0",y_0") +$$
$$\alpha\gamma\delta G(x_0"+1,y_0") + \alpha\beta\delta G(x_0",y_0"+1) +$$
$$\alpha\beta\gamma G(x_0"+1,y_0"+1)\}/(\beta\gamma\delta + \alpha\gamma\delta + \alpha\beta\delta + \alpha\beta\gamma)$$

In order to simplify the processing given by equation (11) above, the ratios $\alpha$, $\beta$, $\gamma$, and $\delta$ can be set to be "1" when the accuracy of x" and y" is set to be 0.5-pixel accuracy.

The image F(x, y) corrected by the image correction unit 314 is stored in a memory (not shown) in the image correction unit 314, and thereafter, is output to the binarization unit 304. The image is binarized by the binarization unit 304, and the binary image data is stored in the memory 306.

A pattern code detection unit 316 receives the binary image data stored in the memory 306 and the marker rough center coordinate positions whose skews are corrected by the image correction unit 314, and detects dots (pattern code dots) in a pattern code 16 sandwiched between a pair of markers.

Subsequently, a pattern code dot center calculation unit 318 calculates the barycentric positions of groups of black pixels of the detected pattern code dot areas, and determines these positions as pattern dot centers.

A marker true center calculation unit 320 receives a plurality of pattern dot center coordinate positions, and calculates marker true centers so as to minimize square errors (evaluation functions) to basis vectors.

The square error (evaluation function) E corresponds to a case wherein all the weights ωi in equations (9) in the second embodiment are "1", and the marker true center coordinate position is given by:

$$x_m' = \frac{\sum_{n=1}^{n} \Delta x_i^2 \sum_{n=1}^{n} x_i - \sum_{n=1}^{n} \Delta x_i \sum_{n=1}^{n} \Delta x_i x_i}{\sum_{n=1}^{n} \Delta x_i^2 - \sum_{n=1}^{n} \Delta x_i \sum_{n=1}^{n} \Delta x_i}, \qquad (12)$$

$$y_m' = \frac{\sum_{n=1}^{n} \Delta y_i^2 \sum_{n=1}^{n} y_i - \sum_{n=1}^{n} \Delta y_i \sum_{n=1}^{n} \Delta y_i y_i}{\sum_{n=1}^{n} \Delta y_i^2 - \sum_{n=1}^{n} \Delta y_i \sum_{n=1}^{n} \Delta y_i}$$

A data reading coordinate calculation unit 322 obtains boundary line segments of a block by connecting the calculated marker true center coordinate positions corresponding to the four corners of the block, and calculates equally dividing points that equally divide these line segments into a predetermined number of line segments.

The data reading coordinate calculation unit 322 connects, in turn, the equally dividing points of the two pairs of opposing boundary line segments of the block in the order from points nearer the marker true centers.

The data reading coordinate calculation unit 322 outputs the intersections of these line segments to a reading pixel black/white discrimination unit 324 as data reading coordinate positions.

The reading pixel black/white discrimination unit 324 discriminates whether each of pixels, corresponding to the data reading coordinate positions calculated by the data reading coordinate calculation unit 322, of the binary image code data stored in the memory 306 is a black or white pixel.

The reading pixel black/white discrimination unit 324 outputs bit "0" when it determines a white pixel; bit "1" when it determines a black pixel.

The reading pixel black/white discrimination unit 324 reads data in the order of an address code 18 and user data 19.

Data read by the reading pixel black/white discrimination unit 324 are sequentially output to an address error correction unit and a data demodulation unit (neither are shown).

As described above, according to the third embodiment, after the distortion of the picked-up image of the dot code caused by the skew of the image pickup unit is corrected, the data reading positions are calculated. Therefore, an error-free data reading operation can be realized.

Figure 8:
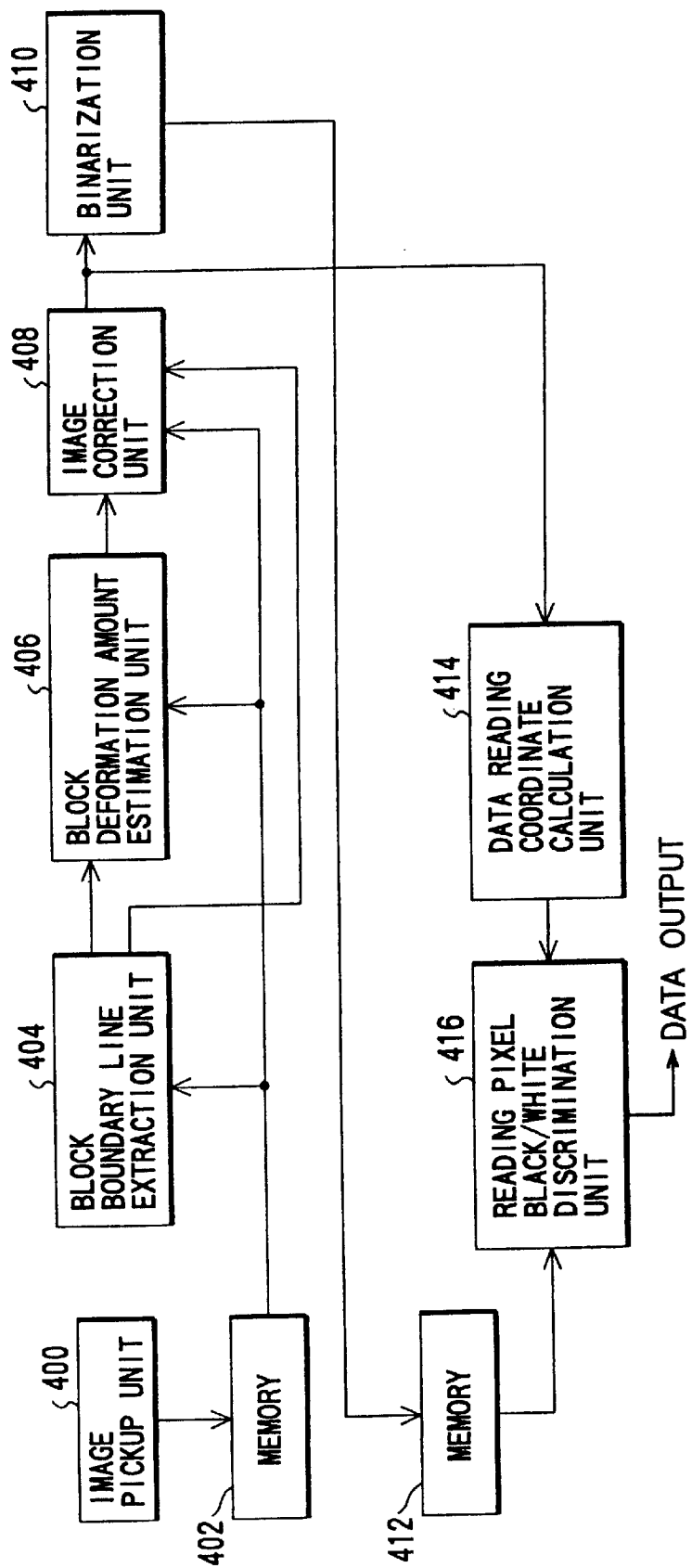
FIG. 8 is a block diagram showing the arrangement of an information reproducing apparatus according to the fourth embodiment of the present invention.

FIG. 8 is a block diagram showing the arrangement of an information reproducing apparatus according to the fourth embodiment of the present invention.

Referring to FIG. 8, an image of a dot code 10 optically picked up by an image pickup unit 400 is stored in a memory 402 as multi-valued image data.

A block boundary line extraction unit 404 extracts block boundary lines 403a, as shown in FIGS. 9A and 9B, and detects the intersection coordinate positions, corresponding to the four corners of each block, of the block boundary lines 403a.

The block boundary line extraction unit 404 determines the detected intersection coordinate positions as block reference points.

Each block boundary line is extracted by obtaining linearly continuous edges by an existing edge extraction method.

On the other hand, when the dot code 10 is recorded on the surface of a paper sheet, only boundary lines are printed using magnetic ink, fluorescent ink, or ink in different color, thus allowing easy extraction of the boundary lines.

A block deformation amount estimation unit 406 receives the intersection coordinate positions detected by the block boundary line extraction unit 404, and calculates the deformation amount of each block.

In the calculation of the deformation amount of each block by the block deformation amount estimation unit 406, the lengths of the four sides of a block are calculated, and it is then checked if the difference between the longest side and the shortest side is equal to or smaller than a threshold value.

When the difference between the longest side and the shortest side is equal to or smaller than the threshold value, the block deformation amount estimation unit 406 determines that the block is not deformed, and outputs a deformation amount =0 to an image correction unit 408.

On the other hand, when the difference between the longest side and the shortest side is larger than the threshold value, the block deformation amount estimation unit 406 extracts an image using a rectangular area within which this block area falls, and defines a distortion amount based on the amount of skew of the extracted rectangular area in a direction perpendicular to a plane that contacts the distal end of the image pickup unit 400, i.e., a plane perpendicular to the lens optical axis of the image pickup unit 400 with respect to the longest side of the block as a reference line.

Note that the reference line is present on the plane perpendicular to the lens optical axis of the image pickup unit 400.

For this purpose, the block deformation amount estimation unit 406 performs rotation processing of the extracted rectangular area to convert the extracted area into a coordinate system corresponding to the pixel arrangement.

This coordinate system conversion formula is as follows:

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix} \quad (13)$$

FIGS. 9C and 9D are views showing the state wherein the block deformation amount estimation unit 406 performs the rotation processing of the extracted rectangular area and converts the extracted area into a coordinate system corresponding to the pixel arrangement.

Referring to FIGS. 9C and 9D, if the longest side of a block is defined as the x-axis, and a direction perpendicular thereto is defined as the y-axis, coordinates obtained by this coordinate system are (x, y).

Furthermore, let (x', y') be the coordinates having the lateral direction of the picked-up image as an x'-axis, and the longitudinal direction as a y'-axis, and θ be the skew between these two coordinate systems.

The block deformation amount estimation unit 406 calculates the pixel value on the converted coordinate system (x, y) in correspondence with that on the nonconverted coordinate system (x', y') using equation (13) above, and when at least one of x' and y' is not an integer, the unit 406 calculates the pixel value by interpolation using surrounding pixels on the coordinate system (x', y').

The extracted area rotated by the block deformation amount estimation unit 406 has a coordinate system in which the x-axis agrees with the longest side of the block, and a direction perpendicular thereto agrees with the y-axis.

At this time, an imaginary skew amount φ between the extracted area and the plane that contacts the distal end of the image pickup unit 400, i.e., the plane perpendicular to the lens optical axis of the image pickup unit 400 with respect to the y-direction can be calculated by the following equation:

$$\phi = \arcsin \frac{D(x'' - x)}{xy''} \quad (14)$$

Figures 10A, 10B:
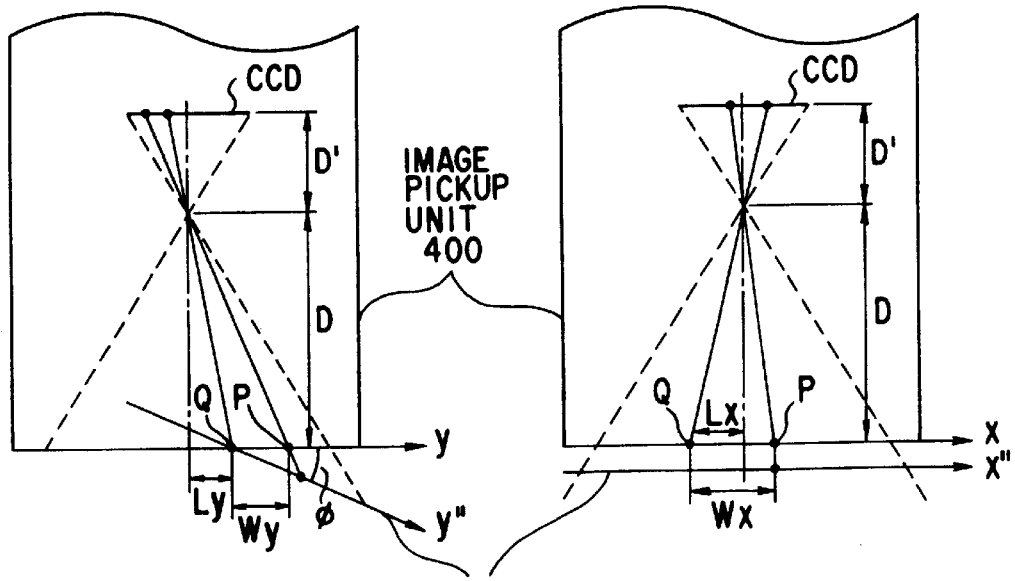
FIGS. 10A and 10B are views for explaining the processing of the block deformation estimation unit.

FIGS. 10A and 10B are views for explaining the correction method using the imaginary skew amount φ.

Referring to FIGS. 10A and 10B, (x'', y'') represent the coordinates on a plane corrected based on the imaginary skew amount φ, and (x, y) represent the coordinates on a plane immediately after the rotation before correction.

The distance D is the distance from the distal end of the image pickup unit 400 to the lens.

FIG. 10A is a view when coordinates (Lx+Wx, Ly+Wy) are viewed from the x-direction, and FIG. 10B is a view when coordinates (Lx+Wx, Ly+Wy) are viewed from the y-direction.

On the other hand, (Lx, Ly) express the origin coordinates of the extracted block area on the image, and Wx and Wy are the widths, in the x- and y-directions, of the extracted block area.

The skew amount φ is calculated using two points, which are not located on the x-axis, of the block reference points located at the four corners of the block.

These two reference points respectively have coordinates (x1, y1) and (x2, y2), and coordinates (x1'', y1'') and (x2'', y2'') of an ideal block free from any distortion, which are calculated based on the two block reference points on the x-axis, and skew amounts φ1 and φ2 are calculated using these reference points.

The block deformation amount estimation unit 406 calculates the average value of the skew amounts φ1 and φ2, and determines the average value as the skew amount φ.

The skew amount φ is output, as a deformation amount, from the block deformation amount estimation unit 406 to the image correction unit 408.

In order to simplify the above-mentioned processing, the rotation processing can be simplified.

In this case, as shown in FIGS. 9E and 9F, one of the boundary lines of the extracted rectangular area, i.e., one of the four sides is used as a reference line for the skew.

Furthermore, the reference line is the boundary line closest to the longest side of the block in this extracted rectangular area.

Thus, the rotation processing in the block deformation estimation unit 406 can be attained by only replacing the x- and y-coordinates or inverting the signs +and −.

The image correction unit 408 corrects the block boundary lines extracted by the block deformation amount estimation unit 406 and each area surrounded by the block boundary lines of the multi-valued image data stored in the memory 402 in accordance with the deformation amount.

This correction is attained by correcting the skew amount φ, and the correction formula is as follows:

$$x = \frac{D(x'' - L_x)\cos^2\phi}{D\cos\phi + y''\sin\phi}, \quad (15)$$

$$y = \frac{D(y'' - L_y)\cos\phi}{D\cos\phi + y''\sin\phi}$$

In this case, when the non-converted coordinates (x, y) corresponding to the converted coordinates (x'', y'') are not integers, the image correction unit 408 generates a corrected image by interpolation of surrounding pixels.

The image corrected by the image correction unit 408 is binarized by a binarization unit 410, and is stored in a memory 412 as binary image code data.

Subsequently, a data reading coordinate calculation unit 414 obtains boundary line segments of a block by connecting the calculated marker true center coordinate positions corresponding to the four corners of the block, and calculates equally dividing points that equally divide these line segments into a predetermined number of line segments.

In this case, the data reading coordinate calculation unit 414 connects, in turn, the equally dividing points of the two pairs of opposing boundary line segments of the block in the order from points nearer the marker true centers.

The data reading coordinate calculation unit 414 outputs the intersections of these line segments to a reading pixel black/white discrimination unit 416 as data reading coordinate positions.

The reading pixel black/white discrimination unit 416 discriminates whether each of pixels, corresponding to the data reading coordinate positions calculated by the data reading coordinate calculation unit 414, of the binary image code data stored in the memory 412 is a black or white pixel.

The reading pixel black/white discrimination unit 416 outputs bit "0" when it determines a white pixel; bit "1" when it determines a black pixel.

The reading pixel black/white discrimination unit 416 reads data in the order of an address code 18 and user data 19.

Data read by the reading pixel black/white discrimination unit 416 are sequentially output to an address error correction unit and a data demodulation unit (neither are shown).

As described above, according to the fourth embodiment, since the data reading coordinate positions are calculated after the distortion of the image of the dot code picked up by the image pickup unit is corrected, an error-free data reading operation can be realized.

In the fourth embodiment, correction processing is performed for each block, may be performed in units of a plurality of blocks, needless to say.

Figure 11:
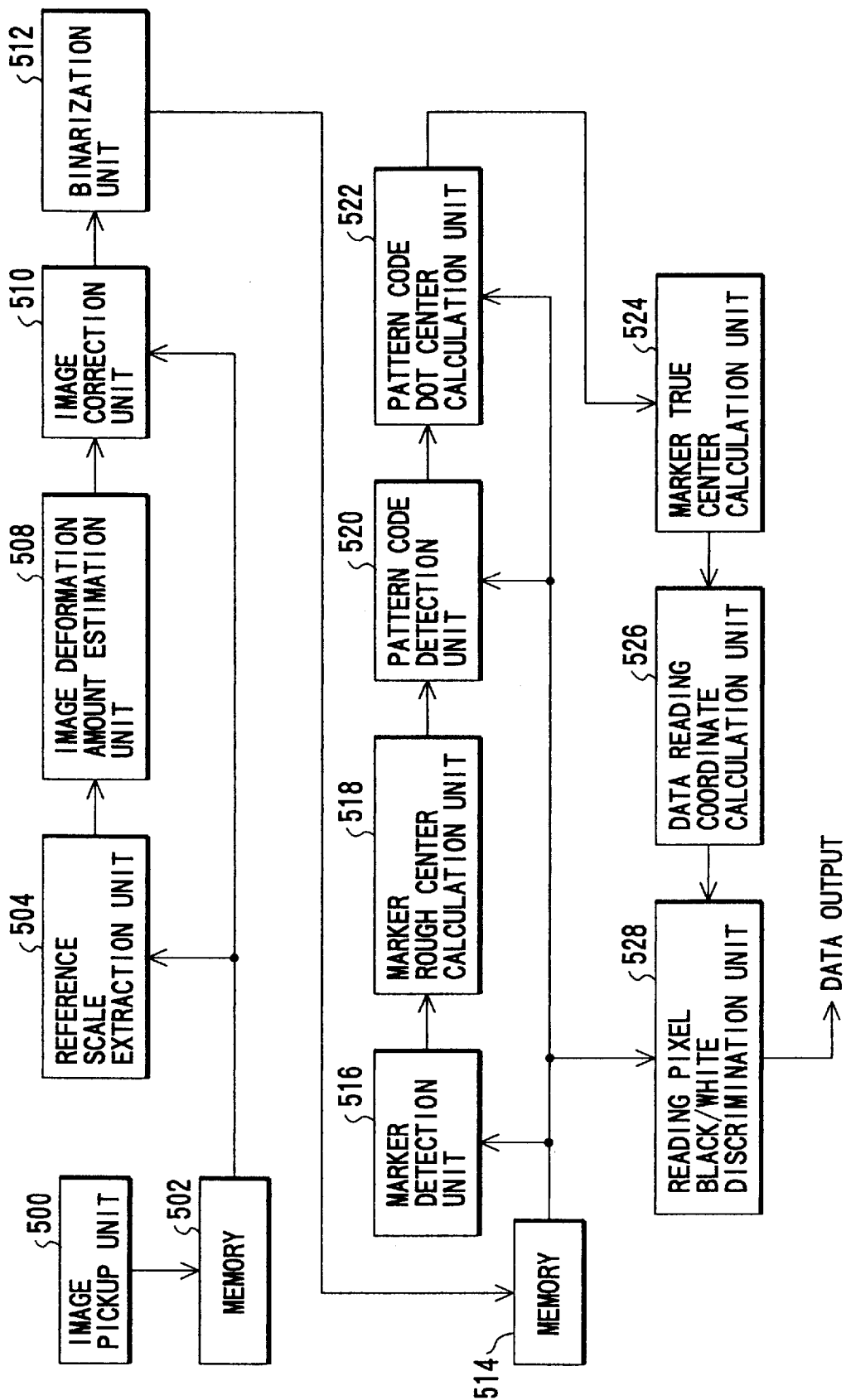
FIG. 11 is a block diagram showing the arrangement of an information reproducing apparatus according to the fifth embodiment of the present invention.

FIG. 11 is a block diagram showing the arrangement of an information reproducing apparatus according to the fifth embodiment of the present invention.

Referring to FIG. 11, an image of a dot code 10 optically picked up by an image pickup unit 500 is stored in a memory 502 as multi-valued image data.

A reference scale extraction unit 504 extracts reference scales 506a inserted in MMP (multimedia paper) codes on which the dot code is recorded, as shown in FIG. 12A.

Each reference scale 506a passes the centers of blocks, and scale marks are added to block boundary portions on the reference scale 506a.

The block boundary portions on the reference scale 506a are used as reference coordinate points 506b.

The reference scale extraction unit 504 obtains a plurality of reference coordinate points from the reference scale 506a located at the upper end of the extracted image, and similarly obtains a plurality of reference coordinate points from the reference scale located at the lower end.

The extraction method of the reference coordinate point is a method of extracting only linearly continuous edges using an existing edge extraction method, and with this method, the reference scales 506a and their scale marks are extracted.

The reference scale extraction unit 504 determines their intersections as reference coordinate points 506b.

When the dot code is recorded on the surface of a paper sheet, the reference scales and their scale marks are printed using magnetic ink, fluorescent ink, or ink in different color, thus allowing easy extraction of the reference scales and their scale marks.

An image deformation amount estimation unit 508 receives the reference scales extracted by the reference scale extraction unit 504, calculates the deformation amount of the reference scales, and then calculates the corresponding skew amount of the image pickup unit 500.

The calculation method of the deformation amount will be described below.

As shown in FIG. 12B, a ratio Wu/W of the horizontal intervals between the reference coordinate positions calculated for the reference scales located at the upper and lower ends of the image, and a ratio Hr/H of the vertical interval between the reference coordinate positions calculated for the reference scales located at the right and left ends of the image are calculated.

These two ratios are converted into skew amounts in the horizontal and vertical directions using a correspondence table stored in a ROM (not shown) that pre-stores the relationship between the interval ratios between the reference coordinate positions and the skew amount between the image pickup unit 500 and the dot code recording surface.

An image correction unit 510 performs projection conversion so as to correct the multi-valued image data stored in the memory 502 on the basis of the skew amounts calculated by the image deformation amount estimation unit 508.

The projection conversion result is stored in a memory (not shown) in the image correction unit 510 as a corrected image.

Since the projection conversion is the same processing as that in the third embodiment, a detailed description thereof will be omitted.

The corrected image is binarized by a binarization unit 512, and is stored in a memory 514 as binary image code data.

A marker detection unit 516 detects markers 14 from the binary image code data stored in the memory 514.

As the detection method of the markers 14, the same method as described above is used.

A marker rough center calculation unit 518 calculates the barycentric positions of the markers 14 on the basis of the areas of the markers 14 detected based on the binary image code data stored in the memory 514, and determines these positions as marker rough centers.

A pattern code detection unit 520 detects dots (pattern code dots) in a pattern code 16 sandwiched between a pair of markers from the binary image code data stored in the memory 514 on the basis of the marker rough center coordinate positions calculated by the marker rough center calculation unit 518.

Subsequently, a pattern code dot center calculation unit 522 calculates the barycentric positions of groups of black pixels of the pattern code dot areas detected by the pattern code detection unit 520, and determines these positions as pattern dot centers.

A marker true center calculation unit 524 receives a plurality of pattern dot center coordinate positions from the pattern code dot center calculation unit 522 and calculates marker true centers that minimize square errors (evaluation functions) to basis vectors.

Since the square error (evaluation function) E corresponds to a case wherein all the weights ωi in equations (9) in the second embodiment are "1", and is the same as that described in the third embodiment, a detailed description thereof will be omitted.

A data reading coordinate calculation unit 526 obtains boundary line segments of a block by connecting the calculated marker true center coordinate positions corresponding to the four corners of the block, and calculates equally dividing points that equally divide these line segments into a predetermined number of line segments.

In this case, the data reading coordinate calculation unit 526 connects, in turn, the equally dividing points of the two pairs of opposing boundary line segments of the block in the order from points nearer the marker true centers.

The data reading coordinate calculation unit 526 outputs the intersections of these line segments to a reading pixel black/white discrimination unit 528 as data reading coordinate positions.

The reading pixel black/white discrimination unit 528 discriminates whether each of pixels, corresponding to the data reading coordinate positions calculated by the data reading coordinate calculation unit 526, of the binary image code data stored in the memory 514 is a black or white pixel.

The reading pixel black/white discrimination unit 528 outputs bit "0" when it determines a white pixel; bit "1" when it determines a black pixel.

The reading pixel black/white discrimination unit 528 reads data in the order of an address code 18 and user data 19.

Data read by the reading pixel black/white discrimination unit 528 are sequentially output to an address error correction unit and a data demodulation unit (neither are shown).

As described above, according to the fifth embodiment, since the data reading coordinate positions are calculated after the distortion of the picked-up image caused by a skew of the image pickup unit is corrected, an error-free data reading operation can be realized.

Figure 13:
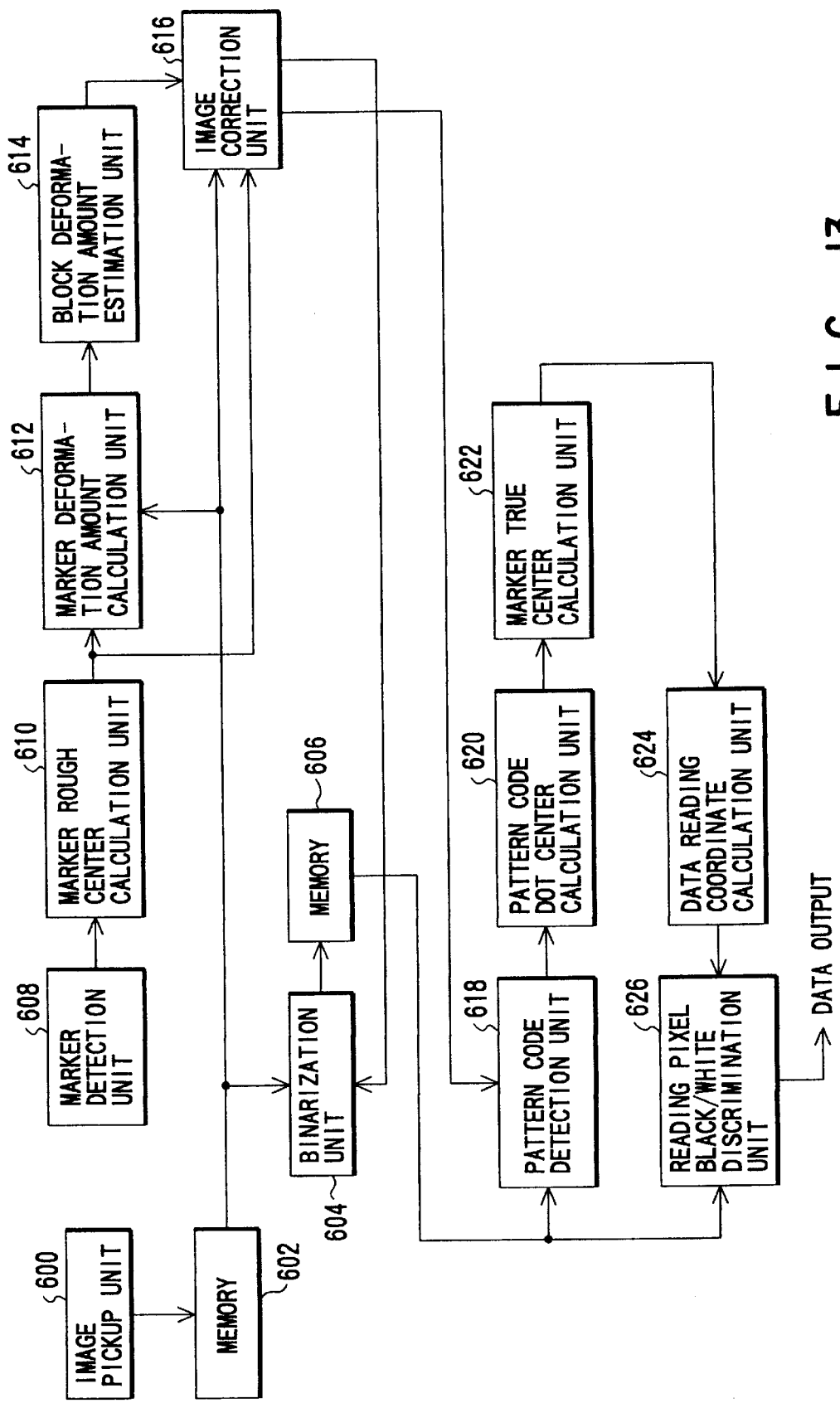
FIG. 13 is a block diagram showing the arrangement of an information reproducing apparatus according to the sixth embodiment of the present invention.

FIG. 13 is a block diagram showing the arrangement of an information reproducing apparatus according to the sixth embodiment of the present invention.

Referring to FIG. 13, an image of a dot code 10 optically picked up by an image pickup unit 600 is stored in a memory 602 as multi-valued image data.

This multi-valued image data is binarized by a binarization unit 604, and is stored in a memory 606 as binary image code data.

A marker detection unit 608 detects markers 14 from the binary image code data stored in the memory 606.

As the detection method of the markers 14, the same method as described above is used.

A marker rough center calculation unit 610 calculates the barycentric positions of the markers 14 on the basis of the areas of the markers 14 detected by the marker detection unit 608 based on the binary image code data stored in the memory 606, and determines these positions as marker rough centers.

A marker deformation amount calculation unit 612 calculates distances, in some predetermined directions, from each marker rough center to a marker boundary (on the perimeter) from the multi-valued image data stored in the memory 602, calculates the average values of the distances for the respective markers, and determines these values as marker sizes.

A block deformation amount estimation unit 614 estimates the block deformation amount on the basis of the relative relationship among the marker sizes of the markers located at the four corners of each block.

Note that block deformation is assumed to have taken place as a block is imaginarily skewed with respect to a plane perpendicular to the lens optical axis of the image pickup unit 600.

As the estimation method of the deformation caused by such skew, the ratio between the largest and smallest marker sizes of those of the markers located at the four corners of a block is calculated.

When the ratio between the largest and smallest marker sizes is smaller than a setting threshold value, the block deformation amount estimation unit 614 determines that the block is free from any distortion, and outputs a deformation amount =0.

On the other hand, when the ratio between the largest and smallest marker sizes is larger than the setting threshold value, the block deformation amount estimation unit 614 determines that the block is distorted, and calculates the deformation amount, i.e., the skew amount.

The method of calculating the deformation amount will be described below.

The block deformation amount estimation unit 614 selects a marker having the largest one of the four marker sizes, and another marker having a larger marker size of the markers adjacent to the selected marker.

The block deformation amount estimation unit 614 determines based on the direction defined by the two selected markers whether the block is skewed with reference to the horizontal or vertical direction.

The block deformation amount estimation unit 614 determines a straight line (a reference line of the skew), where a plane perpendicular to the lens optical axis of the image pickup unit 600 and an imaginarily skewed block plane area cross each other, as a horizontal or vertical line passing the rough center of the marker with the largest marker size.

In this case, the horizontal or vertical line is determined depending on whether the reference direction of the skew is the horizontal or vertical direction.

The block deformation amount estimation unit 614 obtains the deformation amount (skew amount) by converting the calculated ratio between the largest and smallest marker sizes into a skew amount using a correspondence table between the ratio between the largest and smallest marker sizes and the skew amount prepared in advance in a ROM.

Based on the deformation amount, an image correction unit 616 corrects the deformation amount of each block area of the multi-valued image data stored in the memory 602.

The deformation amount is corrected using the same method as in the fourth embodiment.

The multi-valued image data corrected by the image correction unit 616 is binarized by the binarization unit 604, and is stored in the memory 606.

A pattern code detection unit 618 detects dots (pattern code dots) in a pattern code 16 sandwiched between a pair of markers from the corrected binary image data stored in the memory 606 on the basis of the corrected marker rough center coordinate positions.

Subsequently, a pattern code dot center calculation unit 620 calculates the barycentric positions of groups of black pixels of the pattern code dot areas detected by the pattern code detection unit 520, and determines these positions as pattern dot centers.

A marker true center calculation unit 622 receives a plurality of pattern dot center coordinate positions and calculates marker true centers that minimize square errors (evaluation functions) to basis vectors.

Since the square error (evaluation function) E corresponds to a case wherein all the weights ωi in equations (9) in the second embodiment are "1", and is the same as that described in the third embodiment, a detailed description thereof will be omitted.

A data reading coordinate calculation unit 624 obtains boundary line segments of a block by connecting the calculated marker true center coordinate positions corresponding to the four corners of the block, and calculates equally dividing points that equally divide these line segments into a predetermined number of line segments.

In this case, the data reading coordinate calculation unit 624 connects, in turn, the equally dividing points of the two pairs of opposing boundary line segments of the block in the order from points nearer the marker true centers.

The data reading coordinate calculation unit 624 outputs the intersections of these line segments to a reading pixel black/white discrimination unit 626 as data reading coordinate positions.

The reading pixel black/white discrimination unit 626 discriminates whether each of pixels, corresponding to the calculated data reading coordinate positions, of the binary image code data stored in the memory 606 is a black or white pixel.

The reading pixel black/white discrimination unit 626 outputs bit "0" when it determines a white pixel; bit "1" when it determines a black pixel.

The reading pixel black/white discrimination unit 626 reads data in the order of an address code 18 and user data 19.

Data read by the reading pixel black/white discrimination unit 626 are sequentially output to an address error correction unit and a data demodulation unit (neither are shown).

As described above, according to the sixth embodiment, since the data reading coordinate positions are calculated after the distortion of the image of the dot code picked up by the image pickup unit is corrected, an error-free data reading operation can be realized.

Figure 14:
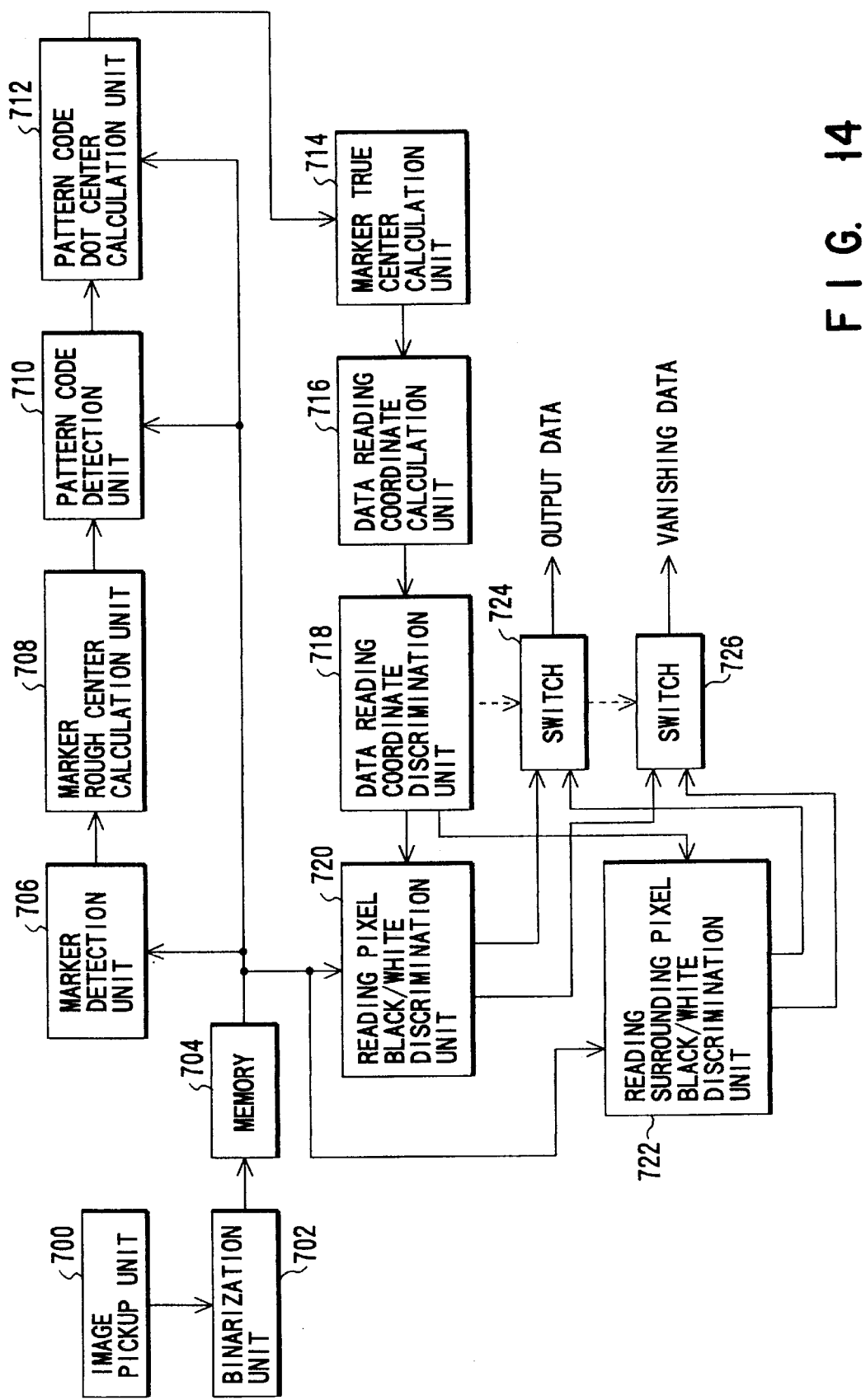
FIG. 14 is a block diagram showing the arrangement of an information reproducing apparatus according to the seventh embodiment of the present invention.

FIGS. 14 and 15 are block diagrams showing the arrangement of an information reproducing apparatus according to the seventh embodiment of the present invention.

Referring to FIG. 14, an image of a code data optically picked up by an image pickup unit 700 is binarized by a binarization unit 702, and is stored in a memory 704 as binary image code data.

A marker detection unit 706 detects markers from the binary image code data stored in the memory 704.

As the detection method of markers 14, the same method as described above is used.

A marker rough center calculation unit 708 calculates the barycentric positions of the markers on the basis of the areas of the markers detected based on the binary image code data stored in the memory 704, and determines these positions as marker rough centers.

A pattern code detection unit 710 detects dots (pattern code dots) in a pattern code sandwiched between a pair of markers from the binary image code data stored in the memory 704 on the basis of the marker rough center coordinate positions calculated by the marker rough center calculation unit 708.

Subsequently, a pattern code dot center calculation unit 712 calculates the barycentric positions of groups of black pixels of the pattern code dot areas detected by the pattern code detection unit 710, and determines these positions as pattern dot centers.

A marker true center calculation unit 714 receives a plurality of pattern dot center coordinate positions from the pattern code dot center calculation unit 712 and calculates marker true centers that minimize square errors (evaluation functions) to basis vectors.

Since the square error (evaluation function) E corresponds to a case wherein all the weights ωi in equations (9) in the second embodiment are "1", and is the same as that described in the third embodiment, a detailed description thereof will be omitted.

A data reading coordinate calculation unit 716 obtains boundary line segments of a block by connecting the calculated marker true center coordinate positions corresponding to the four corners of the block, and calculates equally dividing points that equally divide these line segments into a predetermined number of line segments.

In this case, the data reading coordinate calculation unit 716 connects, in turn, the equally dividing points of the two pairs of opposing boundary line segments of the block in the order from points nearer the marker true centers.

The data reading coordinate calculation unit 716 outputs the intersections of these line segments to a data reading coordinate discrimination unit 718 as data reading coordinate positions.

In this case, the data reading coordinate calculation unit 716 calculates the data reading coordinate positions at accuracy twice that of the resolution of the image picked up by the image pickup unit 700.

Subsequently, the data reading coordinate discrimination unit 718 discriminates whether each of the data reading coordinate positions calculated by the data reading coordinate calculation unit 716 indicates the center of a pixel constituting the image or the boundary between adjacent images.

This discrimination can be attained by checking whether or not at least one of elements x and y of the data reading coordinate position (x, y) is a non-integer.

Only when both the elements x and y are integers, the coordinate position indicates the center of a pixel; otherwise, the coordinate position indicates the boundary between adjacent pixels.

This discrimination will be described below with reference to FIGS. 16A and 16B.

Figures 16A, 16B:
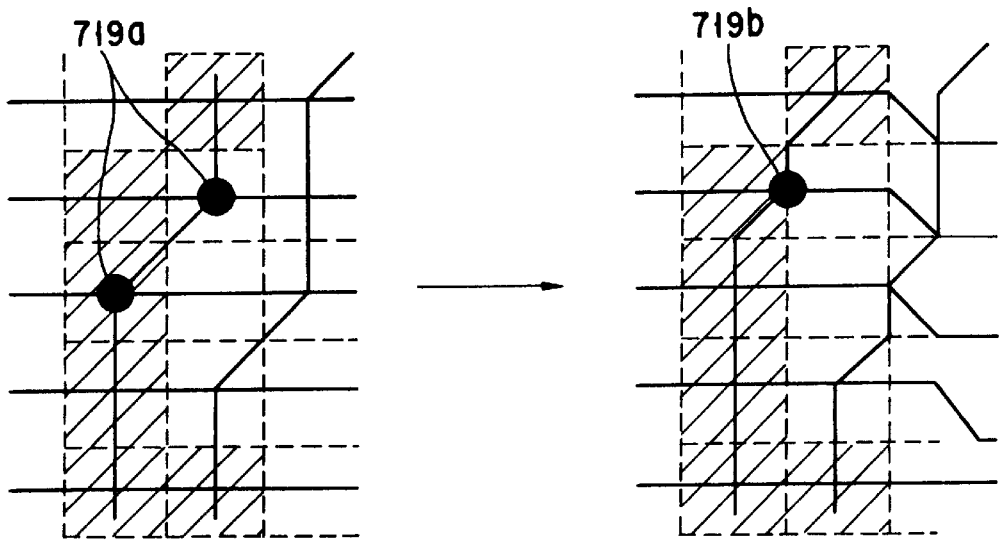
FIGS. 16A and 16B are views showing the reading positions (data reading coordinate positions) when the reading accuracy is 1 pixel and 0.5 pixel.

FIGS. 16A and 16B are views showing the reading positions (data reading coordinate positions) when the reading accuracy is 1 pixel and 0.5 pixel.

FIG. 16A corresponds to 1-pixel accuracy, and FIG. 16B corresponds to 0.5-pixel accuracy.

In FIGS. 16A and 16B, the intersection of solid lines indicates the reading position, and the area surrounded by a broken line indicates a pixel. In an example shown in FIG. 16A, dots 719a are arranged at reading positions that are prone to errors depending on the reading accuracy.

In an example shown in FIG. 16B, vanishing position information is held since a dot 719b may cause an error.

When the data reading coordinate discrimination unit 718 determines that the data reading coordinate position is located at the center of a pixel, a reading pixel black/white discrimination unit 720 receives this data reading coordinate position, and discriminates whether the pixel corresponding to the data reading coordinate position calculated by the data reading coordinate calculation unit 716 is a black or white pixel.

The reading pixel black/white discrimination unit 720 outputs bit "0" when it determines a white pixel; bit "1" when it determines a black pixel.

At this time, the reading pixel black/white discrimination unit 720 determines that the output data is correct, and outputs "0" as vanishing data.

On the other hand, when the data reading coordinate discrimination unit 718 determines that the data reading coordinate position is located at the boundary between adjacent pixels, a reading surrounding pixel black/white discrimination unit 722 receives this data reading coordinate position, and discriminates if pixels that contact the data reading positions calculated by the data reading coordinate calculation unit 716 are all black or white pixels.

The reading surrounding pixel black/white discrimination unit 722 outputs bit "0" when it determines that pixels that contact the data reading coordinate position are all white pixels; bit "1" when it determines that pixels that contact the data reading coordinate position are all black pixels.

At this time, the reading surrounding pixel black/white discrimination unit 722 determines that the output data is correct, and outputs "0" as vanishing data.

On the other hand, when the reading surrounding pixel black/white discrimination unit 722 determines that pixels that contact the data reading coordinate position have another pixel state, it determines that output data is indefinite, and outputs "1" as vanishing data.

Note that "indefinite" means that either "1" or "0" may be output.

Subsequently, the outputs from the reading pixel black/white discrimination unit 720 and the reading surrounding pixel black/white discrimination unit 722 are supplied to switches 724 and 726 which are switched by a control signal output from the data reading coordinate discrimination unit 718.

At this time, the switch 724 is switched in such a manner that when the data reading coordinate position is located at the center of a pixel, output data output from the switch 724 is the output from the reading pixel black/white discrimination unit 720; otherwise, output data output from the switch 724 is the output from the reading surrounding pixel black/white discrimination unit 722.

On the other hand, the switch 726 is switched in such a manner that when the data reading coordinate position is located at the center of a pixel, vanishing data output from the switch 726 is the output from the reading pixel black/white discrimination unit 720; otherwise, the vanishing data output from the switch 726 is the output from the reading surrounding pixel black/white discrimination unit 722.

The output data and vanishing data from the switches 724 and 726 are distributed to a block address error correction unit 734 and a data demodulation unit 736 via switches 728 and 730, which are switched in accordance with a control signal from a controller 732, as shown in FIG. 15.

In this distribution, block address data of the output data from the switch 728 is input to the block address error correction unit 734, and block user data thereof is input to the data demodulation unit 736.

The block address error correction unit 734 performs vanishing correction for the block address data using the vanishing data from the switch 726 so as to improve correction performance.

When the modulation unit (channel byte) of the input block user data includes a vanishing data bit "1", the data demodulation unit 736 corrects the vanishing bit to change the vanishing data to "0" if the vanishing bit can be corrected to abide by the modulation rule.

On the other hand, if the vanishing bit cannot be corrected, i.e., if the vanishing bit abides by the modulation rule irrespective of whether they assume either "1" or "0", or if a plurality of vanishing bits are present and many different correction solutions are available, the data demodulation unit 736 does not change the vanishing data.

The data demodulation unit 736 takes OR of vanishing data in the modulation unit after it performs the above-mentioned bit correction, so as to obtain vanishing data of the demodulated data.

Note that the data demodulation unit 736 may take OR of vanishing data in the modulation unit without performing any bit correction, so as to obtain vanishing data of the demodulated data.

The demodulated data and the vanishing data of the demodulated data from the data demodulation unit 736, and the corrected block address data from the block address error correction unit 734 are de-interleaved by a de-interleave unit 738, and thereafter, the data are output to a user data error correction unit 740.

The user data error correction unit 740 performs error correction such as Reed-Solomon.

In the error correction, vanishing correction using the vanishing data of the demodulated data is performed.

The de-interleave processing is an operation for restoring the interleaved data order of demodulated data to a data order that allows error correction so as to cope with a burst error generated across a plurality of demodulated data.

The data corrected by the user data error correction unit 740 is compressed and decoded by a data compression/decoding unit 742, and the data is output to a data output unit 744.

The data output unit 744 outputs the received data.

For example, if the received data is voice data, the data output unit 744 outputs the received data to a loudspeaker (not shown) as a voice; if the received data is image data, the unit 744 outputs the received data to a monitor (not shown) as an image.

As described above, in the seventh embodiment, since the data reading coordinate position is calculated at an accuracy twice the resolution of the picked-up image, whether or not read information vanishes due to a deviation between the data reading coordinate position and the information recording position of a dot code upon distortion of an optically picked-up image of the code pattern can be discriminated, and error correction can be performed using this vanishing information.

Therefore, in the seventh embodiment, the correction performance can be improved, and information recorded as a dot code of a code pattern on an information recording medium can be reproduced more reliably.

According to the above-mentioned embodiments, even when an optically picked-up image of a code pattern is distorted, information recorded on an information recording medium as a code pattern can be reproduced more reliably.

The present invention has been described with reference to its preferred embodiments. However, the present invention is not limited to the above-mentioned embodiments, but various modifications and applications may be made within the scope of the invention.

The gist of the present invention can be summarized as follows.

(1) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a reference coordinate calculation means for calculating a reference coordinate position that determines a data reading coordinate position in the block by approximation using an Nth-degree curve which passes a group of centers of a plurality of dots arranged at predetermined relative positions on the image.

More specifically, even when the picked-up image is distorted, the data reading coordinate position can be calculated with high accuracy, and data reading errors can be eliminated.

(2) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a weight addition means for adding weights to a plurality of dots which are arranged at predetermined positions on the basis of a relative positional relationship between a reference coordinate position that determines a data reading coordinate position in the block and center coordinate positions of the plurality of dots;

an error evaluation value calculation means for calculating error evaluation values between center coordinate positions of the plurality of dots arranged at the predetermined positions and center coordinate positions of a plurality of dots detected on the image in correspondence with the plurality of dots while adding the weights added by the weight addition means; and a reference coordinate calculation means for calculating the reference coordinate position that minimizes the error evaluation value.

More specifically, even when the picked-up image is distorted, the data reading coordinate position can be calculated with high accuracy, and data reading errors can be eliminated.

(3) An information reproducing apparatus which has an image pickup means for optically reading, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a skew calculation means for calculating a skew between the image pickup means and the code pattern recording surface of the information recording medium on the basis of a relative positional relationship between predetermined reference coordinate positions in the code pattern and a relative positional relationship between reference coordinate positions detected on the image; and a correction means for correcting a distorted picked-up image on the image on the basis of the calculated skew.

More specifically, the skew of the image pickup means can be calculated from the image without adding any skew detection device, and a data reading operation is performed after the distortion of the image due to the skew is corrected, thus eliminating reading errors.

(4) An information reproducing apparatus which has an image pickup means for optically reading, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a skew calculation means for calculating a skew between the image pickup means and the code pattern recording surface of the information recording medium on the basis of a predetermined size of a reference dot in the code pattern and a size of a reference dot detected on the image; and a correction means for correcting a distorted picked-up image on the image on the basis of the calculated skew.

More specifically, the skew of the image pickup means can be calculated from the image without adding any skew detection device, and a data reading operation is performed after the distortion of the image due to the skew is corrected, thus eliminating reading errors.

(5) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a data reading coordinate calculation means for calculating a data reading coordinate position indicating a reading position of data in the block at an accuracy higher than the resolution of the image; and a discrimination means for determining data and discriminating a degree of accuracy by performing reading using at least one of a pixel value of the data reading coordinate position or a plurality of pixel values around the data reading coordinate position on the basis of the calculated data reading coordinate position.

More specifically, by increasing the reading accuracy, reading indefinite data can be calculated. Furthermore, using this reading indefinite data, error correction performance in the next stage can be improved.

(6) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a marker detection means for detecting a plurality of markers representing boundaries of the block;

a marker rough center calculation means for calculating rough centers of the markers;

a pattern code detection means for detecting a pattern code constituted by a plurality of dots with reference to the rough centers of the markers;

a pattern code dot center calculation means for calculating centers of the dots of the pattern code;

an Nth-degree curve approximation calculation means for calculating a curve passing the centers of the dots calculated by the pattern code dot center calculation means by Nth-degree curve approximation;

a marker true center calculation means for calculating points on the curve that minimize distances between the curve calculated by the Nth-degree curve approximation and the rough centers of the markers, and determining the calculated points as a plurality of true centers of the markers;

a data reading coordinate calculation means for calculating a data reading coordinate position in the block on the basis of coordinate positions of the plurality of true centers of the markers; and a data reading means for extracting information from a position corresponding to the calculated data reading coordinate position in the image.

More specifically, even when the picked-up image is distorted, the data reading coordinate position can be calculated with high accuracy, and data reading errors can be eliminated.

(7) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a marker detection means for detecting a plurality of markers representing boundaries of the block;

a marker rough center calculation means for calculating rough centers of the markers;

a pattern code detection means for detecting a pattern code constituted by a plurality of dots with reference to the rough centers of the markers;

a pattern code dot center calculation means for calculating centers of the dots of the pattern code;

a pattern code dot weight addition means for adding weights to the dots of the pattern code on the basis of a relative positional relationship between the rough centers of the markers and the centers of the dots of the pattern code;

a marker true center calculation means for calculating coordinate positions of a plurality of true centers of the markers that minimize evaluation functions which represent relative coordinate errors of the center coordinate positions of the dots added with the weights by the pattern code dot weight addition means and center coordinate positions of dots of a predetermined pattern code with respect to the true center coordinate positions of the markers;

a data reading coordinate calculation means for calculating a data reading coordinate position in the block on the basis of coordinate positions of the plurality of true centers of the markers; and a data reading means for extracting information from a position corresponding to the calculated data reading coordinate position in the image.

More specifically, even when the picked-up image is distorted, the data reading coordinate position can be calculated with high accuracy, and data reading errors can be eliminated.

(8) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a marker detection means for detecting a plurality of markers representing boundaries of the block;

a marker rough center calculation means for calculating rough centers of the plurality of markers;

a skew detection means for detecting a skew of the image on the basis of a positional relationship between the rough centers of the plurality of markers in the image;

an image correction means for correcting the image and the rough centers of the markers on the basis of the detected skew;

a pattern code detection means for detecting a pattern code constituted by a plurality of dots on the basis of the image and the rough centers of the markers, which are corrected by the image correction means;

a pattern code dot center calculation means for calculating centers of the dots of the pattern code;

a marker true center calculation means for calculating coordinate positions of a plurality of true centers of the markers that minimize evaluation functions which represent relative coordinate errors of the center coordinate positions of the dots calculated by the pattern code dot center calculation means and center coordinate positions of dots of a predetermined pattern code with respect to the true center coordinate positions of the markers;

a data reading coordinate calculation means for calculating a data reading coordinate position in the block on the basis of coordinate positions of the plurality of true centers of the markers; and a data reading means for extracting information from a position corresponding to the calculated data reading coordinate position in the image corrected by the image correction means.

More specifically, the skew of the image pickup means can be calculated from the image without adding any special skew detection device, and after the distortion of the image caused by the skew is corrected, a data reading operation is performed, thus eliminating reading errors.

(9) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a block boundary line extraction means for extracting a plurality of boundary lines of the block recorded on the code pattern recording surface of the information recording medium;

a block deformation estimation means for estimating a deformation amount of the block on the basis of the plurality of extracted boundary lines of the block;

an image correction means for correcting the image and the boundary lines of the block on the basis of the deformation amount of the block;

a data reading coordinate calculation means for calculating a data reading coordinate position on the basis of the boundary lines of the block corrected by the image correction means; and a data reading means for extracting information from a position corresponding to the calculated data reading coordinate position in the image corrected by the image correction means.

More specifically, since the distortion is calculated and corrected in units of divided images (blocks), the distortion can be corrected with high accuracy. Furthermore, after the distortion of the image is corrected, a data reading operation is performed, thus eliminating reading errors.

(10) The information reproducing apparatus described in (9) is characterized in that the deformation amount of the block is expressed by an imaginary skew amount of the block area.

More specifically, processing can be simplified by approximating the distortion amount by an imaginary skew amount.

(11) The information reproducing apparatus described in (9) is characterized in that the boundary lines of the block are recorded on the code pattern recording surface using different color ink, magnetic ink,or fluorescent ink.

More specifically, the reference coordinate position of a block for which the distortion is to be calculated can be detected by an easy method.

(12) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a reference scale extraction means for extracting a reference scale recorded on the code pattern recording surface, which scale is used for detecting a skew between an image pickup means and the code pattern recording surface of the information recording medium;

an image deformation estimation means for estimating a distortion amount of the image on the basis of a distortion of the reference scale;

an image correction means for correcting the image on the basis of the distortion amount;

a marker detection means for detecting a plurality of markers representing boundaries of the block from the image corrected by the image correction means;

a marker rough center calculation means for calculating rough centers of the markers;

a pattern code detection means for detecting a pattern code constituted by a plurality of dots with reference to the rough centers of the markers;

a pattern code dot center calculation means for calculating centers of the dots of the pattern code;

a marker true center calculation means for calculating coordinate positions of a plurality of true centers of the markers that minimize evaluation functions which represent relative coordinate errors of the center coordinate positions of the dots calculated by the pattern code dot center calculation means and center coordinate positions of dots of a predetermined pattern code with respect to the true center coordinate positions of the markers;

a data reading coordinate calculation means for calculating a data reading coordinate position in the block on the basis of coordinate positions of the plurality of true centers of the markers; and a data reading means for extracting information from a position corresponding to the calculated data reading coordinate position in the image corrected by the image correction means.

More specifically, the skew of the image pickup means can be calculated from the image without adding any special skew detection device, and after the distortion of the image caused by the skew is corrected, a data reading operation is performed, thus eliminating reading errors.

(13) The information reproducing apparatus described in (12) is characterized in that the reference scale passes the center of the block and is added with scale marks in units of boundaries of the block.

More specifically, an unnecessary area in a block user data area can be reduced as much as possible, and high accuracy of the data reading coordinate position can be maintained.

(14) The information reproducing apparatus described in (12) is characterized in that the reference scale is recorded on the code pattern recording surface using different color ink, magnetic ink, or fluorescent ink.

That is, the reference scale used for calculating the distortion can be detected by an easy method.

(15) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a marker detection means for detecting a plurality of markers representing boundaries of the block;

a marker rough center calculation means for calculating rough centers of the markers;

a marker deformation amount calculation means for calculating a plurality of marker deformation amounts by detecting distances from the rough centers of the markers to outer peripheries of the markers;

a block deformation amount estimation means for estimating a deformation amount of the block on the basis of the plurality of marker deformation amounts;

an image correction means for correcting the image and the rough center positions of the markers on the basis of the deformation amount of the block;

a pattern code detection means for detecting a pattern code constituted by a plurality of dots on the basis of the image and the rough center positions of the markers corrected by the image correction means;

a pattern code dot center calculation means for calculating centers of the dots of the pattern code detected by the pattern code detection means;

a marker true center calculation means for calculating coordinate positions of a plurality of true centers of the markers that minimize evaluation functions which represent relative coordinate errors of the center coordinate positions of the dots calculated by the pattern code dot center calculation means and center coordinate positions of dots of a predetermined pattern code with respect to the true center coordinate positions of the markers;

a data reading coordinate calculation means for calculating a data reading coordinate position in the block on the basis of coordinate positions of the plurality of true centers of the markers; and a data reading means for extracting information from a position corresponding to the calculated data reading coordinate position in the image corrected by the image correction means.

More specifically, since the distortion is calculated and corrected in units of divided images (blocks), the distortion can be corrected with high accuracy. Furthermore, after the distortion of the image is corrected, a data reading operation is performed, thus eliminating reading errors.

(16) An information reproducing apparatus which optically reads, from an information recording medium which comprises a portion that records multimedia information including at least one of audio information, video information, and digital code data in the form of an optically readable code pattern, the code pattern, converts the read code into code data as an image, processes the code data to extract a block as a predetermined data unit from the code data, is characterized by comprising:

a marker detection means for detecting a plurality of markers representing boundaries of the block;

a marker rough center calculation means for calculating rough centers of the markers;

a pattern code detection means for detecting a pattern code constituted by a plurality of dots with reference to the rough centers of the markers;

a pattern code dot center calculation means for calculating centers of the dots of the pattern code detected by the pattern code detection means;

a marker true center calculation means for calculating true center coordinate positions of the markers that minimize evaluation functions which represent relative coordinate errors of the center coordinate positions of the dots calculated by the pattern code dot center calculation means and center coordinate positions of dots of a predetermined pattern code with respect to the true center coordinate positions of the markers;

a data reading coordinate calculation means for calculating a data reading coordinate position in the block on the basis of the coordinate positions of the plurality of true centers of the markers calculated by the marker true center calculation means;

a data reading coordinate discrimination means for discriminating whether or not the data reading coordinate position indicates a center or boundary of a pixel constituting the image by a calculation at an accuracy not less than a predetermined multiple of the pixel constituting the image;

a reading pixel black/white discrimination means for, when the data reading coordinate discrimination means determines that the data reading coordinate position indicates the center of the pixel constituting the image, extracting information from one pixel on the image indicated by the data reading coordinate position; and a reading surrounding pixel black/white discrimination means for, when the data reading coordinate discrimination means determines that the data reading coordinate position indicates the boundary of the pixel constituting the image, extracting information from a plurality of pixels contacting the boundary indicated by the data reading coordinate position and discriminating vanishing data indicating whether or not information is indefinite.

More specifically, by increasing the reading accuracy, reading indefinite data can be calculated. Furthermore, using this reading indefinite data, error correction performance in the next stage can be improved.

(17) The information reproducing apparatus described in (16) is characterized by further comprising an address code vanishing correction means for performing vanishing correction of an address code used for identifying the block on the basis of the vanishing data.

More specifically, since the vanishing correction of a block address can be performed and the correction rate can be improved, omission of blocks can be eliminated.

(18) The information reproducing apparatus described in (16) is characterized by further comprising:

a modulated data correction means for correcting modulated data recorded in the block on the basis of the vanishing data;

a vanishing data changing means for changing the vanishing data upon correction of the modulated data; and a means for ORing the vanishing data changed by the vanishing data changing means to obtain modulation unit vanishing data.

More specifically, since data in the modulation unit can be corrected, reading errors can be eliminated. Furthermore, whether or not correction can be made in the modulation unit can be easily calculated by calculating an OR of data. Furthermore, since the modulation unit vanishing data can be used in error correction in the next stage, correction performance can be improved.

(19) An information recording medium which comprises a portion that records multimedia information including at least one of audio information, video information, and digital code data in the form of an optically readable code pattern, is characterized by comprising:

a reference scale used for detecting a skew of the code pattern.

More specifically, the skew of the image pickup means can be calculated from the image without adding any special skew detection device, and after the distortion of the image caused by the skew is corrected, a data reading operation is performed, thus eliminating reading errors.

As described above, according to the present invention, an information reproducing apparatus and an information recording medium which can reliably reproduce information recorded in the form of a code pattern even when a skew occurs between the reading unit and the recording surface upon a manual scanning operation or the optical system itself has distortion can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An information reproducing apparatus comprising:

image pickup means for optically reading, from an information recording medium which comprises a portion that records multimedia information including at least one of audio information, video information, and digital code data in the form of an optically readable code pattern, the code pattern;

conversion means for converting the code pattern read by said image pickup means into code data as an image;

data reading coordinate calculation means for calculating a data reading coordinate position indicating a reading position of data in a block at an accuracy higher than a resolution of the image upon extraction of the block as a predetermined unit of data from the code data by processing the code data converted by said conversion means;

data determining means for determining data by performing reading using at least one of a pixel value of the data reading coordinate position and a plurality of pixel values around the data reading coordinate position based on the data reading coordinate position calculated by said data reading coordinate calculation means; and accuracy discriminating means for discriminating a degree of accuracy of the data determined by the data determining means based on the data reading coordinate position calculated by said data reading coordinate calculation means.

2. An information reproducing apparatus according to claim 1, further comprising coordinate discriminating means for determining whether the data reading coordinate position is located at a center of a pixel or on a boundary of the pixel based on values of the data reading coordinate position calculated by said data reading coordinate calculation means, said accuracy discriminating means discriminating the degree of accuracy of the data determined by the data determining means based on a determined result of said coordinate discriminating means.

3. An information reproducing apparatus comprising:

image pickup means for optically reading, from an information recording medium which comprises a portion that records multimedia information including at least one of audio information, video information, and digital code data in the form of an optically readable code pattern, the code pattern;

conversion means for converting the code pattern read by said image pickup means into code data as an image;

marker detection means for detecting a plurality of markers representing boundaries of a block upon extraction of the block as a predetermined unit of data from the code data by processing the code data converted by said conversion means;

marker rough center calculation means for calculating rough centers of the markers detected by said marker detection means;

pattern code detection means for detecting a pattern code constituted by a plurality of dots with reference to the rough centers of the markers calculated by said marker rough center calculation means;

pattern code dot center calculation means for calculating centers of the dots of the pattern code detected by said pattern code detection means;

marker true center calculation means for calculating coordinate positions of a plurality of true centers of the markers that minimize evaluation functions representing relative coordinate errors of the center coordinate positions of the dots of the pattern code calculated by said pattern code dot center calculation means and center coordinate positions of dots of a predetermined pattern code with respect to the true center coordinate positions of the markers;

data reading coordinate calculation means for calculating a data reading coordinate position in the block on the basis of the coordinate positions of the plurality of true centers of the markers calculated by said marker true center calculation means;

data reading coordinate discrimination means for discriminating whether the data reading coordinate position calculated by said data reading coordinate calculation means indicates a center or boundary of a pixel constituting the image by performing a calculation at an accuracy not less than a predetermined multiple of the pixel constituting the image;

reading pixel black/white discrimination means for, when said data reading coordinate discrimination means determines that the data reading coordinate position indicates the center of the pixel constituting the image, extracting information from one pixel on the image indicated by the data reading coordinate position; and reading surrounding pixel black/white discrimination means for, when said data reading coordinate discrimination means determines that the data reading coordinate position indicates the boundary of the pixel constituting the image, extracting information from a plurality of pixels contacting the boundary indicated by the data reading coordinate position and discriminating vanishing data indicating whether or not information is indefinite.

4. An apparatus according to claim 3, further comprising address code vanishing correction means for performing vanishing correction of an address code used for identifying the block on the basis of the vanishing data discriminated by said reading surrounding pixel black/white discrimination means.

5. An apparatus according to claim 3, further comprising:

modulated data correction means for correcting modulated data recorded in the block on the basis of the vanishing data discriminated by said reading surrounding pixel black/white discrimination means;

vanishing data changing means for changing the vanishing data upon correction of the modulated data corrected by said modulated data correction means; and means for ORing the vanishing data changed by said vanishing data changing means to obtain modulation unit vanishing data.

\* \* \* \* \*